(12) United States Patent
Kristen et al.

(10) Patent No.: US 7,129,292 B1
(45) Date of Patent: Oct. 31, 2006

(54) METHOD FOR THE EMULSION POLYMERIZATION OF OLEFINS

(75) Inventors: Marc Oliver Kristen, Limburgerhof (DE); Lambertus Manders, Ludwigshafen (DE); Stefan Mecking, Freiburg (DE); Florian M. Bauers, Freiburg (DE); Rolf Mülhaupt, Freiburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 488 days.

(21) Appl. No.: 10/168,113

(22) PCT Filed: Oct. 18, 2000

(86) PCT No.: PCT/EP00/10244

§ 371 (c)(1),
(2), (4) Date: Jun. 17, 2002

(87) PCT Pub. No.: WO01/44325

PCT Pub. Date: Jun. 21, 2001

(30) Foreign Application Priority Data

Dec. 17, 1999 (DE) .................. 199 61 340

(51) Int. Cl.
*C08F 2/16* (2006.01)
(52) U.S. Cl. .................. 524/804; 524/836; 526/93
(58) Field of Classification Search ............ 524/804, 524/836; 526/93
See application file for complete search history.

(56) References Cited

U.S. PATENT DOCUMENTS

| | | | |
|---|---|---|---|
| 3,635,937 A | 1/1972 | Bauer et al. | |
| 3,637,636 A | 1/1972 | Bauer et al. | |
| 3,661,803 A | 5/1972 | Bauer et al. | |
| 3,686,159 A | 5/1972 | Bauer et al. | |
| 4,698,403 A | 10/1987 | Klabunde | |
| 4,716,205 A | 12/1987 | Klabunde | |
| 5,574,091 A | 11/1996 | Walther et al. | |
| 6,800,699 B1 * | 10/2004 | Schmid et al. | 526/93 |

FOREIGN PATENT DOCUMENTS

| | | |
|---|---|---|
| DE | 196 54 168 | 6/1998 |
| EP | 0 046 328 | 2/1982 |
| EP | 0 046 331 | 2/1982 |
| FR | 2 784 110 | 4/2000 |
| WO | 96 23010 | 8/1996 |
| WO | 97 17380 | 5/1997 |
| WO | 97 47661 | 12/1997 |
| WO | 97 48740 | 12/1997 |
| WO | 98/42664 | 10/1998 |
| WO | 98/42665 | 10/1998 |

OTHER PUBLICATIONS

Hans-Ulrich Petereit et al.: "Wassrige Polymerdispersionen" Wiley-VCH Verlag, 1st Ed., pp. 277-294, D. Distler, ed. 1999.
Rodriguez: "Principles of polymer systems" 2nd Ed., McGrawhill Singapur, p. 384 1983.
Hans H. Brintzinger et al.: "Stereospecific olefin polymerization with chiral metallocen catalysts" Angew. Chem., vol. 34, pp. 1143-1170 1995.
L. Wang et al.: J. Am. Chem. Soc., vol. 115, pp. 6999-7000 1993.

(Continued)

*Primary Examiner*—Edward J. Cain
(74) *Attorney, Agent, or Firm*—Oblon, Spivak, McClelland, Maier & Neustadt, P.C.

(57) ABSTRACT

A process for emulsion polymerizing one or more olefins involves reacting it/them with at least one complex compound of the formula Ia or b

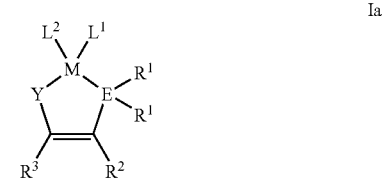

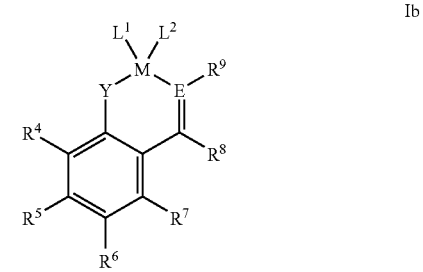

where M is a transition metal from groups 7 to 10 of the Periodic Table of the Elements and is preferably Ni in aqueous dispersion and at least one radical $R^1$ to $R^3$ and optionally one radical $R^4$ to $R^9$ contains a hydrophilic group X, selection being made from $-SO_3^-$, $-O-PO_3^{2-}$, $NH(R^{15})_2^+$, $N(R^{15})_3^+$ or $-(OCH_2CH_2)_nOH$, where n is an integer between 1 and 15. For the process of the invention it is optional to use an activator such as, for example, olefin complexes of rhodium or of nickel. This invention further relates to dispersions of polyolefins such as polyethylene and ethylene copolymers in water, for example, and to the use of the aqueous dispersions of the invention for paper applications such as paper coating or surface sizing, paints, adhesive base materials, molded foams such as mattresses, textile and leather applications, carpet back coatings, or pharmaceutical applications.

17 Claims, No Drawings

OTHER PUBLICATIONS

W. Keim et al.: "Novel coordination of (benzoylmethylene)triphenylphosphorane in a nickel oligomerization catalyst" Angew. Chem., vol. 90, No. 6, pp. 466-467 1978.

Lynda K. Johnson et al.: "New Pd(II)- and Ni(II)-based catalysts for polymerization of ethylene and alpha-olefins" J. Am. Chem. Soc., vol. 117, pp. 6414-6415 1995.

Christopher M. Killian et al.: "Living polymerization of alpha-olefins using NiII-alpha-diimine catalysts. Synthesis of new block polymers based on alpha-olefins" J. Am. Chem. Soc., vol. 118, pp. 11664-11665, 1996.

L.T.J. Nelson et al.: "Polymerization and 1D and 2D NMR analysis of alpha-olefins from late transition metal catalysts" Polymer Preprints, vol. 38, p. 133 1997.

* cited by examiner

METHOD FOR THE EMULSION POLYMERIZATION OF OLEFINS

The present invention relates to a process for emulsion polymerizing one or more olefins by reacting the olefins with a complex compound of the formula Ia or Ib or with a mixture of the complex compounds Ia and Ib

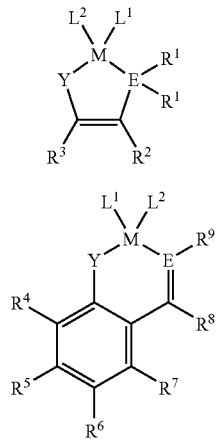

where:
M is a transition metal from groups 7 to 10 of the Periodic Table of the Elements;
$L^1$ is phosphines $(R^{16})_x PH_{3-x}$ or amines $(R^{16})_x NH_{3-x}$ with identical or different radicals $R^{16}$, ethers $(R^{16})_2 O$, $H_2O$, alcohols $(R^{16})OH$, pyridine, pyridine derivatives of the formula $C_5H_{5-x}(R^{16})_x N$, CO, $C_1$–$C_{12}$ alkylnitriles, $C_6$–$C_{14}$ arylnitriles or ethylenically unsaturated double bond systems, x being an integer from 0 to 3,
$L^2$ is halide ions, amide ions $R_h NH_{2-h}$, h being an integer from 0 to 2, and also $C_1$–$C_6$ alkyl anions, allyl anions, benzyl anions or aryl anions, it being possible for $L^1$ and $L^2$ to be linked to one another by one or more covalent bonds,
E is nitrogen, phosphorus, arsenic or antimony,
X is $-SO_3^-$; $-O-PO_3^{2-}$, $NH(R^{15})_2^+$, $N(R^{15})_3^+$ or $-(OCH_2CH_2)_n OH$,
n is an integer from 0 to 15,
Y is oxygen, sulfur, $N-R^{10}$ or $P-R^{10}$,
$R^1$ is hydrogen, $C_1$–$C_{12}$ alkyl groups, $C_7$–$C_{13}$ aralkyl radicals and $C_6$–$C_{14}$ aryl groups, unsubstituted or substituted by a hydrophilic group X,
$R^2$ and $R^3$ are hydrogen,
  hydrophilic groups X,
  $C_1$–$C_{12}$ alkyl, it being possible for the alkyl groups to be branched or unbranched,
  $C_1$–$C_{12}$ alkyl substituted one or more times by identical or different substituents comprising $C_1$–$C_{12}$ alkyl groups, halogens, hydrophilic groups X, $C_1$–$C_{12}$ alkoxy groups or $C_1$–$C_{12}$ thioether groups,
  $C_7$–$C_{13}$ aralkyl,
  $C_3$–$C_{12}$ cycloalkyl,
  $C_3$–$C_{12}$ cycloalkyl substituted one or more times by identical or different substituents comprising $C_1$–$C_{12}$ alkyl groups, halogens, hydrophilic groups X, $C_1$–$C_{12}$ alkoxy groups or $C_1$–$C_{12}$ thioether groups,
  $C_6$–$C_{14}$ aryl,
  $C_6$–$C_{14}$ aryl substituted one or more times by identical or different substituents comprising $C_1$–$C_{12}$ alkyl groups, halogens, hydrophilic groups X, monohalogenated or polyhalogenated $C_1$–$C_{12}$ alkyl groups, $C_1$–$C_{12}$ alkoxy groups, silyloxy groups $OSiR^{10}R^{11}R^{12}$, amino groups $NR^{13}R^{14}$ or $C_1$–$C_{12}$ thioether groups,
  $C_1$–$C_{12}$ alkoxy groups,
  silyloxy groups $OSiR^{10}R^{11}R^{12}$,
  halogens
  or amino groups $NR^{13}R^{14}$,
  it being possible for the radicals $R^2$ and $R^3$ together to form a saturated or unsaturated 5- to 8-membered ring, and
  at least one radical $R^1$, $R^2$ or $R^3$ carrying a hydrophilic group X;
$R^4$ to $R^7$ are hydrogen,
  hydrophilic groups X;
  $C_1$–$C_{12}$ alkyl, it being possible for the alkyl groups to be branched or unbranched,
  $C_1$–$C_{12}$ alkyl, substituted one or more times by identical or different substituents comprising $C_1$–$C_{12}$ alkyl groups, halogens, hydrophilic groups X, $C_1$–$C_{12}$ alkoxy groups or $C_1$–$C_{12}$ thioether groups,
  $C_7$–$C_{13}$ aralkyl,
  $C_3$–$C_{12}$ cycloalkyl,
  $C_3$–$C_{12}$ cycloalkyl substituted one or more times by identical or different substituents comprising $C_1$–$C_{12}$ alkyl groups, halogens, hydrophilic groups X, $C_1$–$C_{12}$ alkoxy groups or $C_1$–$C_{12}$ thioether groups,
  $C_6$–$C_{14}$ aryl,
  $C_6$–$C_{14}$ aryl substituted one or more times by identical or different substituents comprising $C_1$–$C_{12}$ alkyl groups; halogens, hydrophilic groups X, monohalogehated or polyhalogenated $C_1$–$C_{12}$ alkyl groups, $C_1$–$C_{12}$ alkoxy groups, silyloxy groups $OSiR^{10}R^{11}R^{12}$, amino groups $NR^{13}R^{14}$ or $C_1$–$C_{12}$ thioether groups,
  $C_1$–$C_{12}$ alkoxy groups,
  silyloxy groups $OSiR^{10}R^{11}R^{12}$,
  halogens,
  $NO_2$ groups
  or amino groups $NR^{13}R^{14}$,
  it being possible for pairs of adjacent radicals $R^4$ to $R^7$ together to form a saturated or unsaturated 5-8-membered ring,
$R^8$ and $R^9$ are hydrogen, $C_1$–$C_6$ alkyl groups, $C_7$–$C_{13}$ aralkyl groups and $C_6$–$C_{14}$ aryl groups, unsubstituted or substituted by a hydrophilic group X,
$R^{10}$ to $R^{15}$ are hydrogen, $C_1$–$C_{20}$ alkyl groups, which may be substituted in turn by $O(C_1$–$C_6$ alkyl) or $N(C_1$–$C_6$ alkyl$)_2$ groups, or are $C_3$–$C_{12}$ cycloalkyl groups, $C_7$–$C_{13}$ aralkyl radicals and $C_6$–$C_{14}$ aryl groups;
$R^{16}$ is hydrogen, $C_1$–$C_{20}$ alkyl groups, which may in turn be substituted by $O(C_1$–$C_6$ alkyl) or $N(C_1$–$C_6$ alkyl$)_2$ groups, or is $C_3$–$C_{12}$ cycloalkyl groups, $C_7$–$C_{13}$ aralkyl radicals and $C_6$–$C_{14}$ aryl groups unsubstituted or substituted by a hydrophilic group X, in water or in a solvent mixture containing at least 50% by volume of water, optionally in the presence of an activator and an emulsifier.

The compounds Ia and Ib are used in a ratio of from 0:100 to 100:0 mol %. For the process of the invention an activator such as olefin complexes of rhodium or of nickel, for example, is optionally used. This invention further relates to dispersions of polyolefins such as polyethylene and ethylene copolymers, for example, in water, and to the use of the aqueous dispersions of the invention for paper applications such as paper coating or surface sizing, paints, adhesive base materials, molded foams such as mattresses, textile and leather applications, carpet back coatings, or pharmaceutical applications.

Aqueous dispersions of polymers are used commercially in numerous very different applications. Examples that may be mentioned include paper applications (coating and surface sizing), raw materials for paints and varnishes, adhesive base materials (including pressure-sensitive adhesives), textile and leather applications, chemicals for the construction industry, molded foams (mattresses, carpet back coatings), and for medical and pharmaceutical products, as binders for preparations, for example. A compilation is given in D. Distler (editor) "WäBrige Polymerdispersionen", Wiley-VCH Verlag, $1^{st}$ edition, 1999.

To date it has been difficult to prepare aqueous dispersions of polyolefins. However, it would be desirable to be able to provide such aqueous polyolefin dispersions since the monomers such as ethylene or propylene are highly advantageous from economic standpoints.

Current processes for preparing aqueous dispersions of this kind from the corresponding olefins make use either of free-radical high-pressure polymerization or else of the preparation of secondary dispersions. These processes are hampered by disadvantages. The free-radical polymerization processes require extremely high pressures and are restricted on the industrial scale to ethylene and ethylene copolymers, and the necessary apparatus is very expensive to purchase and maintain (F. Rodriguez, Principles of Polymer Systems, $2^{nd}$ edition, McGraw-Hill, Singapore 1983, p. 384). An alternative possibility is first to polymerize ethylene by whatever process and then to prepare a secondary dispersion, as described in U.S. Pat. No. 5,574,091. This method is a multistage process and is therefore very laborious.

For the above reasons it is desirable to polymerize 1-olefins such as ethylene or propylene under the conditions of emulsion polymerization and to prepare the required dispersion in one step from the corresponding monomer. Furthermore, emulsion polymerization processes have the advantage in very general terms that they give polymers having higher molecular masses, in a process which facilitates heat dissipation. Finally, reactions in aqueous systems are of interest in very general terms because water is an inexpensive and environmentally friendly solvent.

However, no satisfactory process has yet been found for the polymerization of 1-olefins such as ethylene or propylene. The problem lies in general in the catalyst required to polymerize these monomers.

Olefins may be polymerized using electrophilic transition metal compounds such as $TiCl_4$ (Ziegler-Natta catalyst) or metallocenes, as described for example by H.-H. Brintzinger et al. in Angew. Chem. 1995, 107, 1255, Angew. Chem., Int. Ed. Engl. 1995, 34, 1143. However, both $TiCl_4$ and metallocenes are sensitive to moisture and are therefore poorly suited to preparing polyolefins in emulsion polymerization. The aluminum alkyls used as cocatalysts are also moisture sensitive, with the consequence that water as a catalyst poison must be carefully excluded.

There are only a few reports of transition metal catalyzed reactions of ethylene in an aqueous medium. For instance, L. Wang et al. in J. Am. Chem. Soc. 1993, 115, 6999 report on a rhodium catalyzed polymerization. However, at around one insertion/hour, the activity is much too low for industrial applications.

The reaction of ethylene with nickel P,O chelate complexes appears much more promising, as described in U.S. Pat. No. 3,635,937, U.S. Pat. No. 3,637,636, U.S. Pat. No. 3,661,803, and U.S. Pat. No. 3,686,159. No polymer analysis data are reported. Furthermore, the reported activity is still too low for industrial applications.

EP-A 0 046 331 and EP-A 0 046 328 report on the reaction of ethylene with Ni chelate complexes of the formula A

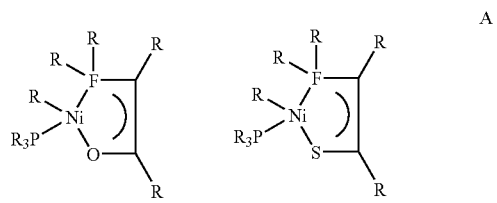

where R is identical or different organic substituents of which one carries a sulfonyl group, and F is phosphorus, arsenic or nitrogen. Under the chosen reaction conditions in solvents such as methanol or mixtures of methanol and a hydrocarbon, only oligomers are obtained, which are unsuitable for the abovementioned applications. The advantage of the sulfonated derivatives over unsulfonated compounds, as described by W. Keim et al. in Angew. Chem. 1978, 90, 493; Angew. Chem., Int. Ed. Engl. 1978, 6, 466, lay in their greater activity.

In U.S. Pat. No. 4,698,403 (column 7, lines 13–18) and in U.S. Pat. No. 4,716,205 (column 6, lines 59–64) it is shown that an excess of water acts as a catalyst poison to bidentate Ni chelate complexes even if they carry a $SO_3^-$ group.

From the documents cited above it is evident that numerous Ni complexes are not polymerization-active in the presence of water.

On the other hand, it is known from WO 97/17380 that palladium compounds of the formula B

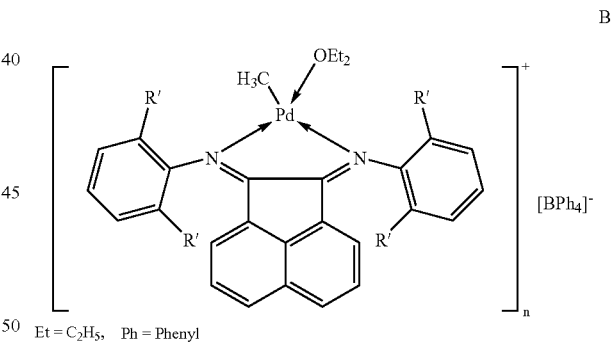

Et = $C_2H_5$,  Ph = Phenyl where R' is, for example, isopropyl groups, or the analogous nickel compounds, are able to polymerize higher olefins such as 1-octene in an aqueous environment. Optionally, an emulsifier may be added in order to facilitate the polymerization. However, it is noted that the temperature of 40° C. ought not to be exceeded, since otherwise the catalyst is deactivated (p. 25, line 5 et seq.). Higher reaction temperatures are, however, desirable in general since they make it possible to increase the activity of a catalyst system.

Further disadvantages of catalyst systems of the formula B are that with ethylene, in general, highly branched polymers are formed (L. K. Johnson J. Am. Chem. Soc. 1995, 117, 6414; C. Killian, J. Am. Chem. Soc. 1996, 118, 11664), which to date have been of fairly minor industrial importance, and with higher α-olefins (L. T. Nelson *Polymer Preprints* 1997, 38, 133) so-called chain running of the active complexes has been an unavoidable observation. This chain running results in a large number of 1,ω-misinsertions, as a result of which amorphous polymers are generally produced whose suitability as materials of construction is low.

It is also known that complexes of the formula C

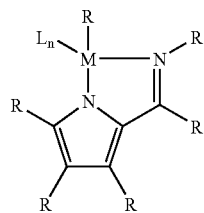

C (WO 98/42665) where M=Ni or Pd and with n neutral ligands L are polymerization-active in the presence of small amounts of water without suffering losses in catalytic activity (p. 16, line 13). However, these amounts of water must not exceed 100 equivalents, based on the complex (page 16, lines 30–31). It is not possible to conduct an emulsion polymerization under these conditions.

It is further known that complexes of the formula D

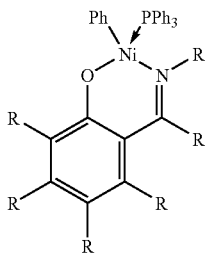

D

Ph = phenyl with identical or different radicals R are also able to polymerize ethylene in the presence of small amounts of water (WO 98/42664, especially page 17, line 14 et seq.). However, these amounts of water must not exceed 100 equivalents, based on the complex (page 17, lines 33–35). It is impossible, however, to conduct an emulsion polymerization under these conditions.

It is an object of the present invention to provide a process which
  polymerizes olefins to polyolefins in the presence of large amounts of water,
  produces materials of construction with minimal branching and with high molecular weights, and
  permits this reaction to be conducted under industrially reasonable conditions.

A further object of the present invention was to use the process of the invention
  to prepare aqueous polyolefin dispersions, and
  to use these polyolefin dispersions for paper applications (coating and surface sizing), raw materials for paints and varnishes, adhesive base materials (including pressure-sensitive adhesives), textile and leather applications, chemicals for the construction industry, molded foams (mattresses, carpet back coatings), and for medical and pharmaceutical products.

We have found that this object is achieved and that complex systems comprising at least one compound of the formula Ia or Ib are outstandingly suitable for polymerizing one or more olefins in emulsion polymerization processes.

Suitable olefins for polymerization that may be mentioned include the following: ethylene, propylene, 1-butene, 1-pentene, 1-hexene, 1-heptene, 1-octene, 1-decene and 1-eicosene, and also branched olefins such as 4-methyl-1-pentene, vinylcyclohexene and vinylcyclohexane, and also styrene, para-methylstyrene and para-vinylpyridine, preference being given to ethylene and propylene. Ethylene is particularly preferred.

The copolymerization of two olefins also takes place successfully with the process of the invention, it being possible to select the comonomer from the following groups:
  1-olefins such as ethylene, propylene, 1-butene, 1-pentene, 1-hexene, 1-heptene, 1-octene, 1-decene and 1-eicosene, and also branched olefins such as 4-methyl-1-pentene, vinylcyclohexene and vinylcyclohexane, as well as styrene, para-methylstyrene and para-vinylpyridine, preference being given to propylene, 1-butene, 1-pentene, 1-hexene, 1-heptene, 1-octene, and 1-decene;
  internal olefins such as norbornene, norbornadiene or cis- or trans-2-butene;
  polar monomers such as acrylic acid, acrylic acid $C_1$–$C_8$ alkyl esters, 2-hydroxyethyl acrylate, 3-hydroxypropyl acrylate, 4-hydroxybutyl acrylate, methacrylic acid, methacrylic acid $C_1$–$C_8$ alkyl esters, $C_1$–$C_6$ alkyl vinyl ethers, and vinyl acetate; preference is given to acrylic acid, methyl acrylate, ethyl acrylate, n-butyl acrylate, 2-ethylhexyl methacrylate, n-butyl methacrylate, ethyl vinyl ether, and vinyl acetate.

The ratio of the two monomers may be chosen freely. Preferred comonomers are 1-olefins and polar monomers. However, it is preferred to use the comonomer in proportions of from 0.1 to 20 mol %, based on the principal monomer.

In the complex compounds of the formulae Ia and Ib, the radicals are defined as follows:
M is a transition metal from groups 7 to 10 of the Periodic Table of the Elements, preferably manganese, iron, cobalt, nickel or palladium, and with particular preference nickel.
$L^1$ is selected from phosphines of the formula $(R^{16})_xPH_{3-x}$ or amines of the formula $(R^{16})_xNH_{3-x}$, where x is an integer between 0 and 3. However, ethers $(R^{16})_2O$ such as diethyl ether or tetrahydrofuran, $H_2O$, alcohols $(R^{16})OH$ such as methanol or ethanol, pyridine, pyridine derivatives of the formula $C_5H_{5-x}(R^{16})_xN$, such as 2-picoline, 3-picoline, 4-picoline, 2,3-lutidine, 2,4-lutidine, 2,5-lutidine, 2,6-lutidine or 3,5-lutidine, CO, $C_1$–$C_{12}$ alkylnitriles or $C_6$–$C_{14}$ arylnitriles, such as acetonitrile, propionitrile, butyronitrile or benzonitrile, may also be chosen. It is also possible to use mono- or polyethylenically unsaturated double bond systems as the ligand $L^1$, such as ethenyl, propenyl, cis-2-butenyl, trans-2-butenyl, cyclohexenyl or norbornenyl.
$L^2$ is selected from
  halide ions such as fluoride, chloride, bromide, or iodide, preferably chloride or bromide,
  amide ions $(R^{16})_hNH_{2-h}$, h being an integer between 0 and 3,
  $C_1$–$C_6$ alkyl anions such as Me$^-$, $(C_2H_5)^-$, $(C_3H_7)^-$, (n-$C_4H_9$)$^-$, (tert-$C_4H_9$)$^-$ or $(C_6H_{14})^-$;

allyl anions or methallyl anions,
benzyl anions, or
aryl anions such as $(C_6H_5)^-$.

In one particular embodiment, $L^1$ and $L^2$ are linked to one another by one or more covalent bonds. Examples of such ligands are 1,5-cyclooctadienyl (COD) ligands, 1,6-cyclodecenyl ligands, or 1,5,9-all-trans-cyclododecatrienyl ligands.

In another particular embodiment, $L^1$ is tetramethylethylenediamine, only one nitrogen being coordinated with the nickel.

E is nitrogen, phosphorus, arsenic or antimony, nitrogen and phosphorus being preferred.

X is selected from $-SO_3^-$, $-O-PO_3^{2-}$, $NH(R^{15})_2^+$, $N(R^{15})_3^+$ or $-(OCH_2CH_2)_nOH$, n being an integer between 1 and 15, preferably from 2 to 10 and with particular preference from 3 to 8.

Y is oxygen, sulfur, $N-R^{10}$ or $P-R^{10}$, oxygen and sulfur being preferred;

$R^1$ is selected from
hydrogen,
$C_1-C_{12}$ alkyl groups unsubstituted or substituted by a hydrophilic group X; examples of unsubstituted $C_1-C_{12}$ alkyl groups are methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1-C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1-C_4$ alkyl such as methyl, ethyl, n-propyl, iso-propyl, n-butyl, iso-butyl, sec-butyl and tert-butyl.

Examples of the $C_1-C_{12}$ alkyl groups substituted by a hydrophilic group X are $CH_2-SO_3^-$, $CH_2-CH_2-SO_3^-$, $-(CH_2)_{10}-SO_3^-$, $-(CH_2)_{12}-SO_3^-$, $-(CH_2)_{16}-SO_3^-$, $-(CH_2)_{18}-SO_3^-$, $-CH_2-NMe_3^+$, $-(CH_2)_{10}-NMe_3^+$, $-(CH_2)_{12}-NMe_3^+$, $-(CH_2)_{16}-NMe_3^+$, $-(CH_2)_{18}-NMe_3^+$, $CH_2-O-CH_2-CH_2-OH$, $CH_2-O-(CH_2-CH_2)_2-OH$, $CH_2-O-(CH_2-CH_2)_3-OH$, $CH_2-O-(CH_2-CH_2)_4-OH$, $CH_2-O-(CH_2-CH_2)_5-OH$, $CH_2-O-(CH_2-CH_2)_6-OH$, or $CH_2-O-(CH_2-CH_2)_8-OH$;

$C_7-C_{13}$ aralkyl radicals unsubstituted or substituted by a hydrophilic group X; examples of unsubstituted aralkyl radicals are $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl; preferred examples of the aralkyl radicals substituted by a hydrophilic group X are meta-benzylsulfonate, para-benzylsulfonate, ortho-$HO(CH_2CH_2)_n$-O-benzyl, meta-$HO(CH_2CH_2)_n$-O-benzyl and para-HO$(CH_2CH_2)_n$-O-benzyl, n being an integer between 1 and 15, preferably from 2 to 10 and with particular preference from 3 to 8.

$C_6-C_{14}$ aryl groups, unsubstituted or substituted by a hydrophilic group X. Examples of unsubstituted $C_6-C_{14}$ aryl groups are phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl.

Examples of $C_6-C_{14}$ aryl groups substituted by hydrophilic groups X are meta-benzosulfonate, ortho-benzosulfonate, para-benzosulfonate, α-(4-naphthosulfonate), β-(4-naphthosulfonate), ortho-$HO(CH_2CH_2)_n$-O-phenyl, meta-$HO(CH_2CH_2)_n$-O-phenyl and para-$HO(CH_2CH_2)$ n-O-phenyl, n being an integer between 1 and 15, preferably from 2 to 10 and with particular preference from 3 to 8.

$R^2$ and $R^3$ are:
hydrogen,
hydrophilic groups X,
$C_1-C_{12}$ alkyl, such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1-C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1-C_4$ alkyl such as methyl, ethyl, n-propyl, iso-propyl, n-butyl, iso-butyl, sec-butyl and tert-butyl, $C_1-C_{12}$ alkyl groups in turn substituted by a hydrophilic group X; examples are $CH_2-CH_2-SO_3^-$, $-(CH_2)_{10}-SO_3^-$, $-(CH_2)_{12}-SO_3^-$, $-(CH_2)_{16}-SO_3^-$, $-(CH_2)_{18}-SO_3^-$, $-CH_2-NMe_3^+$, $-(CH_2)_{10}-NMe_3^+$, $-(CH_2)_{12}-NMe_3^+$, $-(CH_2)_{16}-NMe_3^+$, $-(CH_2)_{18}-NMe_3^+$, $CH_2-(O-CH_2-CH_2)_2-OH$, $-CH_2-(O-CH_2-CH_2)_3-OH$, $CH_2-O-(CH_2-CH_2)_4-OH$, $-O-(CH_2-CH_2)_5-OH$, $CH_2-O-(CH_2-CH_2)_6-OH$ or $CH_2-O-(CH_2-CH_2)_8-OH$ $C_1-C_{12}$ alkyl substituted one or more times by identical or different substituents from the group consisting of halogens, $C_1-C_{12}$ alkoxy groups and $C_1-C_{12}$ thioether groups, these groups being as defined above;

$C_7-C_{13}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl;

$C_3-C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;

among the substituted cycloalkyl groups, mention may be made by way of example of the following: 2-methylcyclopentyl, 3-methylcyclopentyl, cis-2,4-dimethylcyclopentyl, trans-2,4-dimethylcyclopentyl, 2,2,4,4-tetramethylcyclopentyl, 2-methylcyclohexyl, 3-methylcyclohexyl, 4-methylcyclohexyl, cis-2,5-dimethylcyclohexyl, trans-2,5-dimethylcyclohexyl, 2,2,5,5-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,5,5-tetrachlorocyclohexyl, 2-thiomethylcyclopentyl, 2-thiomethylcyclohexyl, 3-thiomethylcyclopentyl, 3-thiomethylcyclohexyl and further derivatives;

$C_6-C_{14}$ aryl, examples being phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_6-C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, substituted by one or more $C_1-C_{12}$ alkyl groups, such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1-C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1-C_4$ alkyl such as methyl, ethyl, n-propyl, iso-propyl, n-butyl, iso-butyl, sec-butyl and tert-butyl;

$C_1-C_{12}$ alkyl groups in turn substituted by a hydrophilic group X; examples are —$CH_2$—$CH_2$—$SO_3^-$, —$(CH_2)_{10}$—$SO_3^-$, —$(CH_2)_{12}$—$SO_3^-$, —$(CH_2)_{16}$—$SO_3^-$, —$(CH_2)_{18}$—$SO_3^-$, —$CH_2$—$NMe_3^+$, —$(CH_2)_{10}$—$NMe_3^+$, —$(CH_2)_{12}$—$NMe_3^+$, —$(CH_2)_{16}$—$NMe_3^+$, —$(CH_2)_{18}$—$NMe_3^+$, —$CH_2$—(O—$CH_2$—$CH_2$)$_2$—OH, —$CH_2$—(O—$CH_2$—$CH_2$)$_3$—OH, —$CH_2$—O—($CH_2$—$CH_2$)$_4$—OH, —O—($CH_2$—$CH_2$)$_5$—OH, —$CH_2$—O—($CH_2$—$CH_2$)$_6$—OH or —$CH_2$—O—($CH_2$—$CH_2$)$_8$—OH;

halogens, such as fluorine, chlorine, bromine and iodine, chlorine and bromine being preferred;

monohalogenated or polyhalogenated $C_1-C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_1-C_{12}$ alkoxy groups, preferably $C_1-C_6$ alkoxy groups such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

silyloxy groups $OSiR^{10}R^{11}R^{12}$, $R^{10}$ to $R^{12}$ being selected independently of one another from hydrogen, $C_1-C_6$ alkyl groups, benzyl radicals and $C_6-C_{14}$ aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

or amino groups $NR^{13}R^{14}$, $R^{13}$ and $R^{14}$ being selected independently of one another from hydrogen, $C_1-C_6$ alkyl groups, benzyl groups and $C_6-C_{14}$ aryl groups, which may form a saturated or unsaturated 5- to 10-membered ring; preference is given to the dimethylamino, the diethylamino, the diisopropylamino, the methylphenylamino group and the diphenylamino group. Examples of amino groups with saturated rings are the N-piperidyl group and the N-pyrrolidinyl group; examples of amino groups with unsaturated rings are the N-pyrryl group, the N-indolyl group and the N-carbazolyl group;

$C_1-C_{12}$ alkoxy groups, preferably $C_1-C_6$ alkoxy groups such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

silyloxy groups $OSiR^{10}R^{11}R^{12}$, $R^{10}$ to $R^{12}$ being selected independently of one another from hydrogen, $C_1-C_6$ alkyl groups, benzyl radicals and $C_6-C_{14}$ aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

halogens, such as fluorine, chlorine, bromine and iodine, chlorine and bromine being preferred;

or amino groups $NR^{13}R^{14}$, $R^{13}$ and $R^{14}$ being selected independently of one another from hydrogen, $C_1-C_6$ alkyl groups and $C_6-C_{14}$ aryl groups, which may form a saturated or unsaturated 5- to 10-membered ring; preference is given to the dimethylamino, the diethylamino, the diisopropylamino, the methylphenylamino group and the diphenylamino group. Examples of amino groups with saturated rings are the N-piperidyl group and the N-pyrrolidinyl group; examples of amino groups with unsaturated rings are the N-pyrryl group, the N-indolyl group and the N-carbazolyl group; it being possible for the radicals $R^2$ and $R^3$ together with the carbon atoms of the parent structure to form a 5- to 8-membered ring. Possible examples of $R^2$ and $R^3$ together are the following: —$(CH_2)_3$— (trimethylene), —$(CH_2)_4$— (tetramethylene), —$(CH_2)_5$— (pentamethylene), —$(CH_2)_6$— (hexamethylene), —$CH_2$—CH=CH—, —$CH_2$—CH=CH—$CH_2$—, —CH=CH—CH=CH—, —O—$CH_2$—O—, —O—CHMe—O—, —O—CH—($C_6H_5$)—O—, —O—$CH_2$—$CH_2$—O—, —O—$CMe_2$—O—, —NMe—$CH_2$—$CH_2$—NMe—, —NMe—$CH_2$—NMe— or —O—$SiMe_2$—O— and at least one radical $R^2$ or $R^3$ carrying a hydrophilic group X.

$R^4$ to $R^7$ are:

hydrogen, hydrophilic groups X, $C_1-C_{12}$ alkyl, such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1-C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1-C_4$ alkyl such as methyl, ethyl, n-propyl, iso-propyl, n-butyl, iso-butyl, sec-butyl and tert-butyl, $C_1-C_{12}$ alkyl substituted one or more times by identical or different substituents from the group consisting of halogens, $C_1-C_{12}$ alkoxy groups and $C_1-C_{12}$ thioether groups, these groups being as defined above;

$C_1-C_{12}$ alkyl groups in turn substituted by a hydrophilic group X; examples are $CH_2$—$CH_2$—$SO_3^-$, —$(CH_2)_{10}$—$SO_3^-$, —$(CH_2)_{12}$—$SO_3^-$, —$(CH_2)_{16}$—$SO_3^-$, —$(CH_2)_{18}$—$SO_3^-$, —$CH_2$—$NMe_3^+$, —$(CH_2)_{10}$—$NMe_3^+$, —$(CH_2)_{12}$—$NMe_3^+$, —$(CH_2)_{16}$—$NMe_3^+$, —$(CH_2)_{18}$—$NMe_3^+$, $CH_2$—$(O$—$CH_2$—$CH_2)_2$—$OH$, —$CH_2$—$(O$—$CH_2$—$CH_2)_3$—$OH$, $CH_2$—$O$—$(CH_2$—$CH_2)_4$—$OH$, —$O$—$(CH_2$—$CH_2)_5$—$OH$, $CH_2$—$O$—$(CH_2$—$CH_2)_6$—$OH$ or $CH_2$—$O$—$(CH_2$—$CH_2)_8$—$OH$ $C_7$–$C_{13}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;

among the substituted cycloalkyl groups, mention may be made by way of example of the following: 2-methylcyclopentyl, 3-methylcyclopentyl, cis-2,4-dimethylcyclopentyl, trans-2,4-dimethylcyclopentyl 2,2,4,4-tetramethylcyclopentyl, 2-methylcyclohexyl, 3-methylcyclohexyl, 4-methylcyclohexyl, cis-2,5-dimethylcyclohexyl, trans-2,5-dimethylcyclohexyl, 2,2,5,5-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,5,5-tetrachlorocyclohexyl, 2-thiomethylcyclopentyl, 2-thiomethylcyclohexyl, 3-thiomethylcyclopentyl, 3-thiomethylcyclohexyl and further derivatives;

$C_6$–$C_{14}$ aryl, examples being phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, substituted by one or more $C_1$–$C_{12}$ alkyl groups, such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl;

$C_1$–$C_{12}$ alkyl groups in turn substituted by a hydrophilic group X; examples are —$CH_2$—$CH_2$—$SO_3^-$, —$(CH_2)_{10}$—$SO_3^-$, —$(CH_2)_{12}$—$SO_3^-$, —$(CH_2)_{16}$—$SO_3^-$, —$(CH_2)_{18}$—$SO_3^-$, —$CH_2$—$NMe_3^+$, —$(CH_2)_{10}$—$NMe_3^+$, —$(CH_2)_{12}$—$NMe_3^+$, —$(CH_2)_{16}$—$NMe_3^+$, —$(CH_2)_{18}$—$NMe_3^+$, —$CH_2$—$(O$—$CH_2$—$CH_2)_2$—$OH$, —$CH_2$—$(O$—$CH_2$—$CH_2)_3$—$OH$, —$CH_2$—$O$—$(CH_2$—$CH_2)_4$—$OH$, —$CH_2$—$O$—$(CH_2$—$CH_2)_5$—$OH$, —$CH_2$—$O$—$(CH_2$—$CH_2)_6$—$OH$ or —$CH_2$—$O$—$(CH_2$—$CH_2)_8$—$OH$;

halogens, such as fluorine, chlorine, bromine and iodine, chlorine and bromine being preferred;

$NO_2$ groups, hydrophilic groups X, monohalogenated or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_1$–$C_{12}$ alkoxy groups, preferably $C_1$–$C_6$ alkoxy groups such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

silyloxy groups $OSiR^{10}R^{11}R^{12}$, $R^{10}$ to $R^{12}$ being selected independently of one another from hydrogen, $C_1$–$C_6$ alkyl groups, benzyl radicals and $C_6$–$C_{14}$ aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

or amino groups $NR^{13}R^{14}$, $R^{13}$ and $R^{14}$ being selected independently of one another from hydrogen, $C_1$–$C_6$ alkyl groups, benzyl groups and $C_6$–$C_{14}$ aryl groups, which may form a saturated or unsaturated 5- to 10-membered ring; preference is given to the dimethylamino, the diethylamino, the diisopropylamino, the methylphenylamino group and the diphenylamino group. Examples of amino groups with saturated rings are the N-piperidyl group and the N-pyrrolidinyl group; examples of amino groups with unsaturated rings are the N-pyrryl group, the N-indolyl group and the N-carbazolyl group;

$C_1$–$C_{12}$ alkoxy groups, preferably $C_1$–$C_6$ alkoxy groups such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

silyloxy groups $OSiR^{10}R^{11}R^{12}$, $R^{10}$ to $R^{12}$ being selected independently of one another from hydrogen, $C_1$–$C_6$ alkyl groups, benzyl radicals and $C_6$–$C_{14}$ aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

halogens, such as fluorine, chlorine, bromine and iodine, chlorine and bromine being preferred;

$NO_2$ groups or amino groups $NR^{13}R^{14}$, $R^{13}$ and $R^{14}$ being selected independently of one another from hydrogen, $C_1$–$C_6$ alkyl groups and $C_6$–$C_{14}$ aryl groups, which may form a saturated or unsaturated 5- to 10-membered ring; preference is given to the dimethylamino, the diethylamino, the diisopropylamino, the methylphenylamino group and the diphenylamino group. Examples of amino groups with saturated rings are the N-piperidyl group and the N-pyrrolidinyl group; examples of amino groups with unsaturated rings are the N-pyrryl group, the N-indolyl group and the N-carbazolyl group;

it being possible for pairs of adjacent radicals $R^4$ to $R^7$ together with the carbon atoms of the parent aromatic to form a 5- to 8-membered ring which may carry further substituents Z. Possible examples of $R^4$ and $R^5$ together are the following: —$(CH_2)_3$— (trimethylene), —$(CH_2)_4$— (tetramethylene), —$(CH_2)_5$— (pentamethylene), —$(CH_2)_6$— (hexamethylene), —$CH_2$—CH=CH—, —$CH_2$—CH=CH—$CH_2$—, —CH=CH—CH=CH—, —O—$CH_2$—O—, —O—CHMe—O—, —O—CH($C_6H_5$)—O—, —O—$CH_2$—$CH_2$—O—, —O—$CMe_2$—O—, —NMe—$CH_2$—$CH_2$—NMe—, —NMe—$CH_2$—NMe— or —O—$SiMe_2$—O—.

$R^8$ and $R^9$ are chosen from:

- $C_1$–$C_{12}$ alkyl groups unsubstituted or substituted by a hydrophilic group X; examples of unsubstituted $C_1$–$C_{12}$ alkyl groups are methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl.

Examples of the $C_1$–$C_{12}$ alkyl groups substituted by a hydrophilic group X are $CH_2$—$SO_3^-$, $CH_2$—$CH_2$—$SO_3^-$, —$(CH_2)_{10}$—$SO_3^-$, —$(CH_2)_{12}$—$SO_3^-$, —$(CH_2)_{16}$—$SO_3^-$, —$(CH_2)_{18}$—$SO_3^-$, —$CH_2$—$NMe_3^+$, —$(CH_2)_{10}$—$NMe_3^+$, —$(CH_2)_{12}$—$NMe_3^+$, —$(CH_2)_{16}$—$NMe_3^+$, —$(CH_2)_{18}$—$NMe_3^+$, —$CH_2$—O—$CH_2$—$CH_2$—OH, —$CH_2$—O—$(CH_2$—$CH_2)_2$—OH, $CH_2$—O—$(CH_2$—$CH_2)_3$—OH, —$CH_2$—O—$(CH_2$—$CH_2)_4$—OH, —$CH_2$—O—$(CH_2$—$CH_2)_5$—OH, —$CH_2$—O—$(CH_2$—$CH_2)_6$—OH, or —$CH_2$—O—$(CH_2$—$CH_2)_8$—OH;

- $C_7$–$C_{13}$ aralkyl radicals unsubstituted or substituted by a hydrophilic group X; examples of unsubstituted aralkyl radicals are $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl; preferred examples of the aralkyl radicals substituted by a hydrophilic group X are meta-benzylsulfonate, para-benzylsulfonate, ortho-HO($CH_2CH_2)_n$—O-benzyl, meta-HO($CH_2CH_2)_n$—O-benzyl and para-HO($CH_2CH_2)_n$—O-benzyl, n being an integer between 1 and 15, preferably from 2 to 10 and with particular preference from 3 to 8.

- $C_6$–$C_{14}$ aryl groups unsubstituted or substituted by a hydrophilic group X; examples of unsubstituted $C_6$–$C_{14}$ aryl groups are phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl; examples of $C_6$–$C_{14}$ aryl groups substituted by hydrophilic groups X are meta-benzosulfonate, ortho-benzosulfonate, para-benzosulfonate, α-(4-naphthosulfonate), β-(4-naphthosulfonate), ortho-HO($CH_2CH_2)_n$—O-phenyl, meta-HO($CH_2CH_2)_n$—O-phenyl and para-HO($CH_2CH_2)_n$—O-phenyl, n being an integer between 1 and 15, preferably from 2 to 10 and with particular preference from 3 to 8.

In one particular embodiment of the process, complexes of the formula Ib' are used

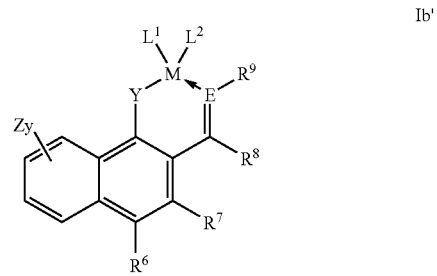

Ib' where the substituents Z can be identical or different and are selected from the following groups:

- hydrogen;
- halogen such as fluorine, chlorine, bromine and iodine, preferably fluorine or chlorine;
- $C_1$–$C_4$ alkyl such as methyl, ethyl, n-propyl, iso-propyl, n-butyl, iso-butyl, sec-butyl and tert-butyl;
- hydrophilic groups X, X being as defined above,
- $NO_2$,
- $C_1$–$C_4$ alkoxy such as methoxy, ethoxy, n-propoxy, n-butoxy and tert-butoxy.

One or more radicals $R^4$ to $R^9$ may carry identical or different hydrophilic groups X. Preference is given to those embodiments of the process in which at least one or two or more radicals $R^4$ to $R^9$ carries/carry a hydrophilic group X.

$R^{10}$ to $R^{15}$ are selected independently of one another from

- hydrogen,
- $C_1$–$C_{20}$ alkyl groups, such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-octyl, n-nonyl, iso-nonyl, n-decyl, iso-decyl, n-undecyl, iso-undecyl, n-dodecyl, iso-dodecyl, n-tetradecyl, n-hexadecyl, n-octadecyl and n-eicosyl; with particular preference $C_1$–$C_4$ alkyl such as methyl, ethyl, n-propyl, iso-propyl, n-butyl, iso-butyl, sec-butyl and tert-butyl;
- $C_1$–$C_{20}$ alkyl groups substituted by O($C_1$–$C_6$ alkyl) or N($C_1$–$C_6$ alkyl)$_2$ radicals, such as for example $CH_2$—$CH_2$—$OCH_3$ or $CH_2$—$CH_2$—$NMe_2$;
- $C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;
- $C_7$–$C_{13}$ aralkyl radicals, preferably $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl;
- $C_6$–$C_{14}$ aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

it being possible for pairs of adjacent radicals $R^{10}$ to $R^{15}$ to form, together with the relevant heteroatom, a 5- to 8-membered ring. Possible examples of $R^{10}$ and $R^{11}$ together are the following: —$(CH_2)_3$— (trimethylene), —$(CH_2)_4$— (tetramethylene), —$(CH_2)_5$— pentamethylene), —$(CH_2)_6$— (hexamethylene), —CH₂—CH═CH—, —CH₂—CH═CH—CH₂—, —CH═CH—CH═CH—, —O—CH₂—O—, —O—CHMe—O—, —O—CH—(C₆H₅)—O—, —O—CH₂—CH₂—O—, —O—CMe₂—O—, —NMe—CH₂—CH₂—NMe—, —NMe—CH₂—NMe— or —O—SiMe₂—O—;

$R^{16}$ are identical or different are chosen from
hydrogen,
- $C_1$–$C_{20}$ alkyl groups, such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-octyl, n-nonyl, iso-nonyl, n-decyl, iso-decyl, n-undecyl, iso-undecyl, n-dodecyl, iso-dodecyl, n-tetradecyl, n-hexadecyl, n-octadecyl and n-eicosyl; with particular preference $C_1$–$C_4$ alkyl such as methyl, ethyl, n-propyl, iso-propyl, n-butyl, iso-butyl, sec-butyl and tert-butyl;
- $C_1$–$C_{20}$ alkyl groups substituted by $O(C_1$–$C_6$ alkyl) or $N(C_1$–$C_6$ alkyl)$_2$ radicals, such as for example $CH_2$—$CH_2$—$OCH_3$ or $CH_2$—$CH_2$—$NMe_2$;
- $C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;
- $C_7$–$C_{13}$ aralkyl radicals, preferably $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl;
- $C_6$–$C_{14}$ aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl; unsubstituted or substituted by a hydrophilic group X.

For compounds of the formula Ia or Ib with ionic hydrophilic groups, counterions are necessary in order to compensate the electrical charge. For electrostatic compensation of negative charges such as —$SO_3^-$ or O—$PO_3^{2-}$, cations of the alkali metals such as $Li^+$, $Na^+$, $K^+$, $Rb^+$ and $Cs^+$ have proven suitable, preference being given to $Na^+$ and $K^+$ on account of their lower price. Also suitable are ammonium salts with cations of the formula $NR^{15}_zH_{4-z}$, $R^{15}$ being as described above and z being an integer from 0 to 4. Particularly preferred ammonium ions are $[NH_4]^+$, $[NEt_2H_2]^+$, $[NMe_4]^+$, $[HN(n-C_4H_9)_3]^+$, $[N(n-C_4H_9)_4]^+$, $[n-C_{16}H_{33}NMe_3]^+$ and $[C_6H_5—NHMe_2]^+$.

For electrostatic compensation of positive charges such as $NH(R^{15})_2^+$ or $N(R^{15})_3^+$, a large number of anions have proven suitable. Examples that may be mentioned include the following: halides such as fluoride, chloride, bromide or iodide; and also hydrogen sulfate, triflate $CF_3SO_3^-$, acetate, $BF_4^-$, $[B(C_6H_5)_4]^-$, $[B(C_6F_5)_4]^-$ or $PF_6^-$ or $SbF_6^-$, preference being given to chloride and hydrogen sulfate.

It is also possible for the complex of formula Ia or Ib to carry two different hydrophilic groups, namely an anionic group selected from —$SO_3^-$ and —O—$PO_3^{2-}$ and a cationic group selected from $NH(R^{15})_2^+$ or $N(R^{15})_3^+$, so that the zwitterionic complex is electrically neutral.

Selected, very particularly preferred compounds of the formula Ia are:

$Na^+$ [Ni(Ph)PPh₃(κ²P,OPh₂PC(SO₃⁻)═C(—O)(p-MeC₆H₄)] (formula Ia.1, see Working Example)

$[n-C_{16}H_{33}NMe_3]^+$ [Ni(Ph)PPh₃(κ²P,OPh₂PC(SO₃⁻)═C(—O)(p-MeC₆H₄)] (formula Ia.2, see Working Example)

$Na^+$ [Ni(Ph)PPh₃(κ²P,O(o-MeC₆H₄)₂PC(SO₃⁻)═C(—O)(p-MeC₆H₄)]

$[n-C_{16}H_{33}NMe_3]^+$ [Ni(Ph)PPh₃(κ²P,OPh₂PC(SO₃⁻)═C(—O)(p-MeC₆H₄)]

$Na^+$[Ni(Ph)PPh₃(κ²P,OPh₂PC(SO₃⁻)═C(—O)(p-MeC₆H₄)]

where Me=methyl and Ph=phenyl, and also the compounds depicted below of the formula Ia.3 to Ia.10:

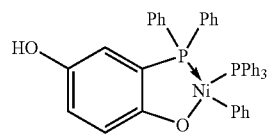

Ia.3

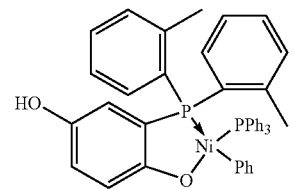

Ia.4

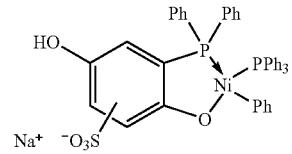

Ia.5

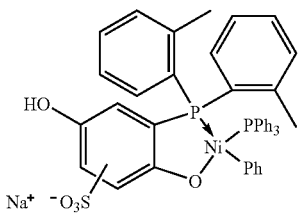

Ia.6

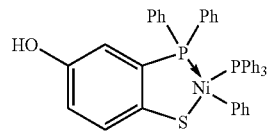

Ia.7

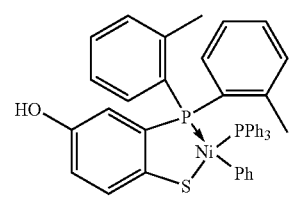

Ia.8

-continued

Ia.9
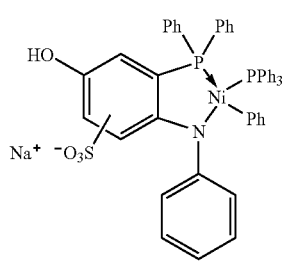

Ia.10
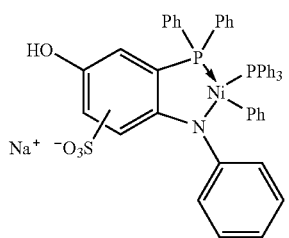

Selected, very particularly preferred compounds of the formula Ib are:

[O-3,5-I$_2$C$_6$H$_2$-o-C(H)—N=C2,6(i-C$_3$H$_7$)$_2$C$_6$H$_3$]Ni(C$_6$H$_5$) (PPh$_3$) (formula Ib.1, see Working Example)

[O-3,5-I$_2$C$_6$H$_2$-o-CMe—N=C2,6(i-C$_3$H$_7$)$_2$C$_6$H$_3$]—Ni(C$_6$H$_5$) (PPh$_3$)

[O-3-(9-anthracenyl)C$_6$H$_3$-o-C(H)—N=C2,6(i-C$_3$H$_7$)$_2$C$_6$H$_3$]Ni(C$_6$H$_5$) (PPh$_3$)

[O-3-(9-anthracenyl)-5-NO$_2$—C$_6$H$_2$-o-C(H)—N=C2,6(i-C$_3$H$_7$)$_2$C$_6$H$_3$]Ni(C$_6$H$_5$)(PPh$_3$)

Na$^+$ [O-3-(9-anthracenyl)-5-(SO$_3^-$)—C$_6$H$_2$-o-C(H)—N=C2,6(i-C$_3$H$_7$)$_2$C$_6$H$_3$]—Ni(C$_6$H$_5$)(PPh$_3$)

[O-3-(9-anthracenyl)-5-I—C$_6$H$_2$-o-C(H)—N=C2,6(i-C$_3$H$_7$)$_2$C$_6$H$_3$]Ni(C$_6$H$_5$)—(PPh$_3$)

and also the compounds depicted below of the formulae Ib'.1 to Ib'.10.

Ib'.1
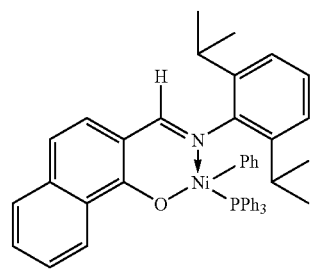

Ib'.2

Ib'.3
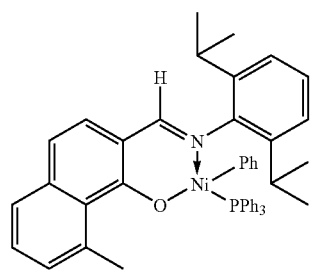

Ib'.4
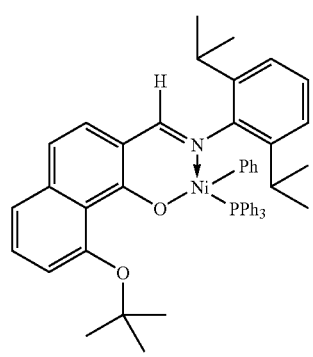

Ib'.5
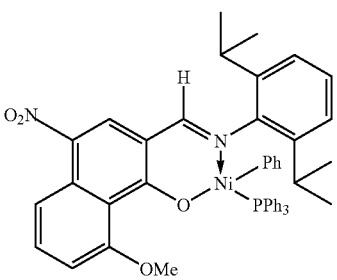

Ib'.6
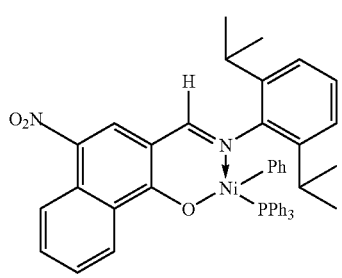

Ib'.7
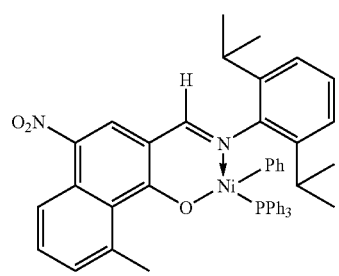

19

-continued

Ib'.8

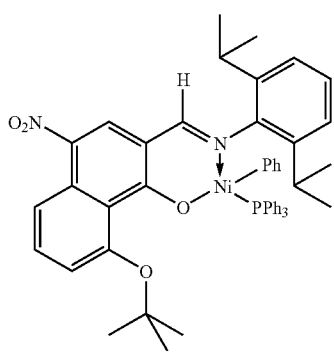

Ib'.9

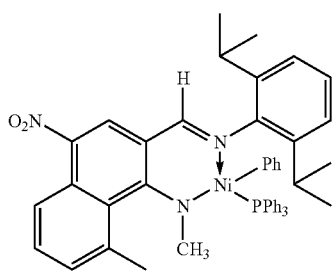

Ib'.10

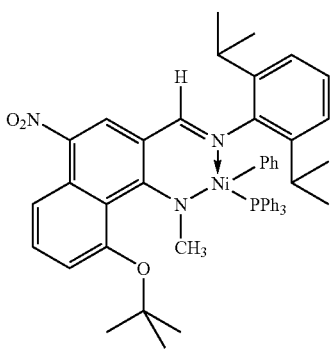

The synthesis of the complexes of the formula Ia and Ib is known per se. Synthesis procedures for complexes of the formula Ia can be found in EP-A 0 046 331, EP-A 0 046 328 and EP-A 0 052 929. Procedures for the synthesis of complexes of the formula Ib can be found in the applications WO 98/30609 and WO 98/42664 and in the publication by C. Wang et al., *Organometallics* 1998, 17, 3149. The sulfonations were in each case conducted in accordance with the formulation described by N. A. Nesmeyanov et al. in *Dokl. Akad. Nauk SSSR* 1963, 151, 856. For the nomenclature of the compounds of the formula Ib, the nomenclature used is that in analogy to WO 98/42664.

The compounds Ia and Ib may be used in a ratio of from 0:100 to 100:0 mol %. Preferred embodiments are 0:100 mol %, 10:90 mol %, 50:50 mol %, 90:10 mol % and 100:0 mol %.

Numerous complexes of the formula Ia or b are polymerization-inactive by themselves. They require an activator, which is commonly supposed to abstract the ligand $L^1$. Said activator may comprise olefin complexes of rhodium or of nickel.

Preferred nickel (olefin)$_y$ complexes available commercially from Aldrich are Ni(C$_2$H$_4$)$_3$, Ni(1,5-cyclooctadiene)$_2$

20

"Ni(COD)$_2$," Ni(1,6-cyclodecadiene)$_2$, or Ni(1,5,9-all-trans-cyclododecatriene)$_2$. Particular preference is given to Ni(COD)$_2$.

Particularly suitable are mixed ethylene/1,3-dicarbonyl complexes of rhodium, examples being rhodium acetylacetonate-ethylene Rh(acac) (CH$_2$=CH$_2$)$_2$, rhodium benzoylacetonate-ethylene Rh(C$_6$H$_5$—CO—CH—CO—CH$_3$) (CH$_2$=CH$_2$)$_2$ or Rh(C$_6$H$_5$—CO—CH—CO—C$_6$H$_5$) (CH$_2$=CH$_2$)$_2$. The most suitable is Rh(acac)(CH$_2$=CH$_2$)$_2$. This compound may be synthesized in accordance with the formulation of R. Cramer from *Inorg. Synth.* 1974, 15, 14.

Some complexes of the formula Ia or b may be activated by ethylene. The ease of the activation reaction depends critically on the nature of the ligand $L^1$. For instance, where $L^1$ is a tetramethylethylenediamine ligand it has been found that no activator is required.

The polymerization of the 1-olefins using the metal complexes of the invention may be carried out in a manner known per se.

The sequence of addition of the reagents for the polymerization is not critical. For instance, gaseous monomer may be injected onto the solvent or liquid monomer metered in, first of all, and the catalyst is added subsequently. Alternatively, the catalyst solution may first be diluted with further solvent, and monomer added subsequently.

The actual polymerization usually runs under a minimum pressure of 1 bar; below this pressure, the polymerization rate is too low. Preference is given to 2 bar, while a minimum pressure of 10 bar is particularly preferred.

4000 bar may be mentioned as the maximum pressure; at higher pressures, the requirements imposed on the material of the polymerization reactor are very high, and the process becomes uneconomic. Preference is given to 100 bar, and particular preference to 50 bar.

The polymerization temperature may be varied within a wide range. 10° C. may be specified as the minimum temperature, since at lower temperatures the rate of polymerization falls. Preference is given to a minimum temperature of 40° C., and particular preference to 65° C. As the maximum practicable temperature, it is possible to specify 350° C. and preferably 150° C.; particular preference is given to 100° C.

Prior to the polymerization, the complexes are dissolved in an organic solvent or in water. Several minutes' stirring or shaking ensure that the solution is clear. The stirring time may be between 1 and 100 minutes, depending on the solubility of the structure in question.

At the same time, the activator, if required, is dissolved in a second portion of the same solvent or else in acetone.

Suitable organic solvents are aromatic solvents such as benzene, toluene, ethylbenzene, ortho-xylene, meta-xylene and para-xylene, and mixtures thereof. Also suitable are cyclic ethers such as tetrahydrofuran and dioxane or acyclic ethers such as diethyl ether, di-n-butyl ether, diisopropyl ether or 1,2-dimethoxy-ethane. Ketones as well, such as acetone, methyl ethyl ketone or diisobutyl ketone, are suitable, likewise amides such as dimethylformamide or dimethylacetamide. Furthermore, mixtures of these solvents with one another are suitable, as are mixtures of these solvents with water or with alcohols such as methanol or ethanol.

Preference is given to acetone and water and to mixtures of acetone and water, the proportion being arbitrary.

The amount of the solvent is likewise not critical; however, it is necessary to ensure that the complex and the activator are able to dissolve completely—otherwise, losses of activity may be expected. If desired, the dissolution process may be accelerated by means of ultrasonic treatment.

The emulsifier for optional addition may be dissolved in a third portion of the solvent or else may be dissolved together with the complex.

The amount of the emulsifier is chosen such that the mass ratio between monomer and emulsifier is greater than 1, preferably greater than 10 and with particular preference greater than 20. The less the amount of emulsifier that need be used, the better.

The complexes of the formula Ia and Ib may themselves act as emulsifiers. The polymerization activity, however, is significantly increased if an additional emulsifier is added. This emulsifier may be nonionic or ionic in nature.

Customary nonionic emulsifiers are, for example, ethoxylated mono-, di- and tri-alkylphenols (EO units: ie 3 to 50, alkyl: $C_4$–$C_{12}$) and also ethoxylated fatty alcohols (EO units: 3 to 80; alkyl: $C_8$–$C_{36}$). Examples thereof are the Lutensol® grades from BASF AG or the Triton® grades from Union Carbide. Customary anionic emulsifiers are, for example, alkali metal salts and ammonium salts of alkyl sulfate (alkyl: $C_8$ to $C_{12}$), of sulfuric monoesters with ethoxylated alkanols (EO units: 4 to 30, alkyl: $C_{12}$–$C_{18}$) and with ethoxylated alkylphenols (EO units: 3 to 50, alkyl: $C_4$–$C_{12}$), of alkylsulfonic acids (alkyl: $C_{12}$–$C_{18}$) and of alkylarylsulfonic acids (alkyl: $C_9$–$C_{18}$).

Suitable cationic emulsifiers are, in general, $C_6$–$C_{18}$ alkyl-, $C_6$–$C_{18}$ aralkyl- or heterocycle-containing primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides or acetates of the various N-cetylpyridinium chloride, N-laurylpyridinium sulfate, and N-cetyl-N,N,N-trimethylammonium bromide, N-dodecyl-N,N,N-trimethylammonium bromide, N,N-distearyl-N,N-dimethylammonium chloride, and the gemini surfactant N,N'-(lauryldimethyl)ethylenediamine dibromide. Numerous further examples can be found in H. Stache, *Tensid-Taschenbuch*, Carl-Hanser-Verlag, Munich, Vienna, 1981 and in McCutcheon's *Emulsifiers & Detergents*, MC Publishing Company, Glen Rock, 1989.

Subsequently, the components—complex in solution, optionally the solution of the emulsifier, and optionally the solution of the activator—are placed in the polymerization reactor. Polymerization reactors which have proven useful are stirred vessels and autoclaves and also tube reactors, it being possible for the tube reactors to be configured as loop reactors.

The monomer or monomers to be polymerized is or are mixed in the polymerization medium. Said polymerization medium may comprise water or mixtures of water with the abovementioned solvents. It should be ensured that the proportion of water is at least 50% by volume, based on the total mixture, preferably at least 90% by volume and with particular preference at least 95% by volume.

The solutions of the complex, of the activator if appropriate and of the emulsifier if appropriate are combined with the mixture of monomer and aqueous polymerization medium. The sequence of the addition of the various components is not critical per se. However, it is necessary for the components to be combined with sufficient rapidity that there is no crystallization of any poorly soluble complex compounds which may occur as intermediates.

Suitable polymerization processes include in principle both continuous and batchwise processes. Preference is given to semicontinuous (semi-batch) processes, in which, after all of the components have been mixed, monomer or monomer mixtures is or are metered in subsequently in the course of the polymerization.

In accordance with the process of the invention, aqueous polymer dispersions are initially obtained.

The average diameters of the polymer particles in the dispersions of the invention are from 10 to 1000 nm, preferably from 50 to 500 nm and with particular preference from 70 to 350 nm. The distribution of the particle diameters may, but need not be, very uniform. For certain applications, especially those with high solids contents (>55%), broad or bimodal distributions are in fact preferred.

The polymers obtained in accordance with the process of the invention have technically advantageous properties. In the case of polyethylene, they have a high degree of crystallinity, as may be demonstrated, for example, by the number of branches. Less than 40 branches, preferably less than 20 branches per 1000 carbon atoms of the polymer, and with particular preference less than 10 branches are found, as determined by $^1$H-NMR and $^{13}$C-NMR spectroscopy.

The enthalpies of fusion of the polyethylenes obtainable by the process of the invention are greater than 100 J/g, preferably greater than 140 and with particular preference greater than 180 J/g, measured by DSC.

The molecular weight distributions of the polyethylenes obtainable by the process of the invention are narrow, i.e., the Q values are from 1.1 to 3.5, preferably from 1.5 to 3.1.

An advantage of the dispersions of the invention, in addition to the favorable price owing to the inexpensive monomers and processes, is that they are more stable to weathering than are dispersions of polybutadiene or butadiene copolymers. Relative to dispersions of polymers containing acrylates or methacrylates as principal monomer, the reduced tendency to undergo hydrolysis is an advantage that may be mentioned. Also advantageous is that the majority of olefins are highly volatile and unpolymerized residual monomers can easily be removed. A final advantage is that there is no need to add molecular mass regulators such as tert-dodecyl mercaptan, for example, during the polymerization, which on the one hand are difficult to separate off and on the other hand have an unpleasant odor.

From the aqueous dispersions obtained initially, it is possible by removing the water and any organic solvent or solvents to obtain the polymer particles as such. Numerous common techniques are suitable for removing the water and any organic solvent or solvents, examples being filtration, spray drying, and evaporation. The polymers obtained in this way possess a good morphology and a high bulk density.

The particle size may be determined using light scattering methods. An overview is given in D. Distler (editor) "WäBrige Polymerdispersionen", Wiley-VCH Verlag, 1$^{st}$ edition, 1999, Chapter 4.

The dispersions of the invention may be used to advantage in numerous applications, such as, for example, paper applications such as paper coating or surface sizing, and also in paints and varnishes, chemicals for the construction industry, adhesive base materials, molded foams, textile and leather applications, carpet back coatings, mattresses, and pharmaceutical applications.

Paper coating is the coating of the paper surface with aqueous pigmented dispersions. In this case, the dispersions of the invention are advantageous on account of their favorable price. Surface sizing is the pigment-free application of hydrophobicizing substances. In this case, the polyolefin dispersions, as particularly hydrophobic substances, which have to date been difficult to obtain under economic conditions, are of particular advantage. A further advantage is that during the preparation of the dispersions of the invention for paper coating or surface sizing there is no need to add any molecular mass regulators such as tert-dodecyl mercaptan, for example, which on the one hand are difficult to separate off and on the other hand have an unpleasant odor.

In paints and varnishes the dispersions of the invention are particularly suitable because their pricing is very favorable. Aqueous polyethylene dispersions are particularly advantageous, because in addition they also have a particular UV stability. Aqueous polyethylene dispersions are also particularly suitable because they are resistant to chemicals, which are common in chemicals for the construction industry.

In adhesives, especially in adhesives for self-adhesive labels or films and also plasters, but also in construction adhesives or industrial adhesives, the dispersions of the invention have economic advantages. In construction adhesives in particular they are especially favorable because they are resistant to basic chemicals, which are common in chemicals for the construction industry. In molded foams which can be produced from the dispersions of the invention by processes known per se such as the Dunlop process or the Talalay process, the favorable price of the dispersions of the invention is again advantageous. Further components used are gelling agents, soaps, thickeners, and vulcanizing pastes. Molding foams are processed, for example, into mattresses.

Textile and leather applications serve to durabilize and enhance textile or leather. Among the effects, mention may be made by way of example of the impregnation and the further finishing of the textiles. An advantage of the dispersions of the invention as a constituent in textile and leather applications, besides the favorable price, is the freedom from odor, since olefins as residual monomers can be removed easily.

Carpet back coatings are used to bond the carpet fiber to the backing, and also have the function of giving the carpet the necessary rigidity and of providing uniform distribution of additives such as flame retardants or antistats, for example. An advantage of the dispersions of the invention besides the favorable price is their insensitivity to the common additives. In particular, the polyethylene dispersions of the invention have proven to be particularly inert chemically. Finally, it is advantageous that during the preparation of the dispersions of the invention for carpet back coatings there is no need to add molecular mass regulators such as tert-dodecyl mercaptan, for example, which on the one hand are difficult to separate off and on the other hand have an unpleasant odor.

By pharmaceutical preparations are meant dispersions as vehicles for drugs. Dispersions as vehicles for drugs are known per se. Advantages of the dispersions of the invention as vehicles for drugs include the economically favorable price and their resistance to physiological influences such as gastric fluid or enzymes.

WORKING EXAMPLES

General notes: unless otherwise described, the syntheses were carried out in accordance with the Schlenk technique in the absence of air and moisture.

Tetrahydrofuran, toluene, dichloromethane, diethyl ether and pentane were rendered absolute before being used (dichloro-methane: calcium hydride; others: sodium) and distilled under argon.

The viscosity measurements on the polymers were carried out in accordance with ISO 1628-3. The molecular mass determinations were carried out by means of GPC. In accordance with DIN 55672, the conditions chosen were as follows: solvent 1,2,4-trichloro-benzene, flow rate: 1 ml/min; temperature: 140° C. Measurement was carried out on a Waters 150C instrument which had been calibrated with polyethylene standards.

1. Ligand Synthesis $[C_{16}H_{33}NMe_3]^+$ $[Ph_3P-C(H)(SO_3^-)C(=O)-4-MeC_6H_4]$ 1.1 Preparation of $Ph_3P=CHC(=O)-4-MeC_6H_4$ 17.8 g of methyltriphenylphosphonium bromide (49.8 mmol) were introduced as an initial charge under argon and suspended in 80 ml of tetrahydrofuran. 27.8 ml of a 1.6 M solution of butyl-lithium in hexane (corresponding to 44.4 mmol of butyl-lithium) were injected into this suspension with stirring. Clarification of the suspension and a color change from yellow to red were observed. The solution was subsequently stirred for 60 minutes until the starting material was completely dissolved, and then a solution of 3.87 g (25 mmol) of p-toluenesulfonyl chloride in 10 ml of tetrahydrofuran was injected. This produced a yellow discoloration and the precipitation of a white solid. The reaction mixture was then stirred for 2 hours before being poured into 400 ml of water, and the resulting suspension was extracted with five times 150 ml of diethyl ether. The combined organic phases were dried over sodium sulfate, filtered and subsequently concentrated intensively. The solution was stored at 4° C. overnight and the pale yellow precipitated solid was filtered off with suction (4 g, 10.1 mmol). The mother liquor was concentrated even more intensively and cooled again. This gave a further 1.5 g (3.8 mmol) of product, so that the overall yield of $Ph_3P=CHC(=O)-4-MeC_6H_4$ was 5.5 g (13.9 mmol, 56%).

1.2 Preparation of $Ph_3P^+-C(H)(SO_3^-)-C(=O)-4-MeC_6H_4$ 2.1 g (13.2 mmol) of sulfur trioxide-pyridine adduct were introduced as an initial charge under an argon atmosphere. A solution of 5 g (12.7 mmol) of $Ph_3P=CHC(=O)-4-MeC_6H_4$ in 40 ml of methylene chloride was added slowly dropwise with ice cooling. Within a few minutes a yellow solution was formed, which was stirred at room temperature overnight. Subsequently, the solvent was stripped off, and the colorless residue obtained was stirred in 30 ml of ethanol, filtered off with suction and washed with twice 15 ml of ethanol. Drying under reduced pressure gave 4.5 g (9.5 mmol) of $Ph_3P^+-C(H)(SO_3^-)-C(=O)-4-MeC_6H_4$ as a colorless powder in 75% yield.

1.3 Preparation of $[C_{16}H_{33}NMe_3]^+[Ph_3P=C(SO_3^-)-C(=O)-4-MeC_6H_4]$ 3.87 g (8.17 mmol) of $Ph_3P^+-C(H)(SO_3^-)-C(=O)-4-MeC_6H_4$ were suspended in 50 ml of a 2:1 methanol/water mixture and titrated with hexadecyltrimethylammonium hydroxide solution (10% in water) using 1 drop of 1% strength ethanolic phenolphthalein solution as indicator. The pH was additionally monitored using pH-fix indicator paper. Toward the end of the titration, the suspension was heated to 50° C. and titration was continued until finally a clear solution (pH=7.5) was obtained. The solvent was subsequently stripped off and traces of water were removed by azeotropic distillation with ethanol. This and drying under an oil pump vacuum gave 5.16 g (6.81 mmol) of $[C_{16}H_{33}NMe_3]^+$ $[Ph_3P=C(SO_3^-)-C(=O)-4-MeC_6H_4]$ as a colorless hygroscopic solid in 83% yield.

The similar ligand $Na^+[Ph_3P=C(SO_3^-)-C(=O)-4-MeC_6H_4]$ was obtained using aqueous sodium hydroxide solution for the neutralization.

2. Complex Synthesis [C$_{16}$H$_{33}$NMe$_3$]$^+$[Ni(Ph)PPh$_3$ ($\kappa^2$P, OPh$_2$PC(SO$_3^-$)=C(—O)(p-MeC$_6$H$_4$)]

The synthesis was carried out under an argon atmosphere employing the standard Schlenk technique. 709 mg (2.58 mmol) of Ni(COD)$_2$ were suspended in 25 ml of tetrahydrofuran at −30° C., 1 equivalent (676 mg) of triphenylphosphine was added with stirring, and the appearance of a red coloration was observed. A solution of 1 equivalent (1.954 g) of the ligand [C$_{16}$H$_{33}$NMe$_3$]$^+$[Ph$_3$P=C(SO$_3^-$)—C(=O)-4-MeC$_6$H$_4$] in 25 ml of THF, heated beforehand to 50° C. in order to dissolve the ligand completely, was injected (using a transfer cannula) with stirring into the reaction mixture obtained by adding the triphenylphosphine. The mixture was allowed to warm to room temperature and then heated briefly to 50° C., after which the dark solution was stirred overnight at room temperature. Finally, the solvent was removed under reduced pressure, the residue was taken up in 50 ml of toluene and filtered, and the filtrate was concentrated under reduced pressure to about ⅕ of its volume. The toluenic phase was combined with 70 ml of pentane and the precipitate formed was filtered off. It was subsequently washed a number of times with pentane and dried under reduced pressure to give 2.453 g (2.27 mmol) of the complex [C$_{16}$H$_{33}$NMe$_3$]$^+$ [Ni(Ph)PPh$_3$($\kappa^2$P,OPh$_2$PC—(SO$_3^-$)=C(—O)(p-MeC$_6$H$_4$)] in 88% yield as a yellow solid.

The analogous sodium complex Na$^+$[Ni(Ph)PPh$_3$($\kappa^2$P,OPh$_2$PC(SO$_3^-$)=C(—O)—(p-MeC$_6$H$_4$)] was obtained using the ylide ligand Na$^+$[Ph$_3$P=C(SO$_3^-$)—C(=O)-4-MeC$_6$H$_4$], in which case there was no need to warm the reaction mixture.

Characteristic NMR data:

[C$_{16}$H$_{33}$NMe$_3$]$^+$ [Ph$_3$P=C(SO$_3^-$)C(=O)-4-MeC$_6$H$_4$]

$^{31}$P-NMR (CDCl$_3$, 200 MHz, externally 85% strength H$_3$PO$_4$) δ 16.8 (s)

Na$^+$ [Ph$_3$P=C(SO$_3^-$)C(=O)-4-MeC$_6$H$_4$]

$^{31}$P-NMR (CDCl$_3$, 200 MHz, externally 85% strength H$_3$PO$_4$) δ 16.7 (s)

[C$_{16}$H$_{33}$NMe$_3$]$^+$ [Ni(Ph)PPh$_3$ ($\kappa^2$P,OPh$_2$PC(SO$_3^-$)=C(—O)(p-MeC$_6$H$_4$)]

$^{31}$P-NMR (C$_6$D$_6$, 200 MHz, externally 85% strength H$_3$PO$_4$) δ 38.3 (d, $^2$J(P,P)=136.4 Hz), δ 21.0 (d, $^2$J(P,P)=136.4 Hz)

Na$^+$[Ni(Ph)PPh$_3$ ($\kappa^2$P,OPh$_2$PC(SO$_3^-$)=C(—O)(p-MeC$_6$H$_4$)]

$^{31}$P-NMR (C$_6$D$_6$, 200 MHz, externally 85% strength H$_3$PO$_4$) δ 35.4 (d, $^2$J(P,P)=138.7 Hz), δ 21.0 (d, $^2$J(P,P)=138.8 Hz)

3. Polymerization Examples 3.1 General Notes

The polymerization experiments were conducted in a steel autoclave (Büchi-Miniclave), temperature regulation was carried out externally using a poly(ethylene glycol) heating bath, the stirring speed (propeller stirrer) was 1000 rpm, and the total liquid phase volume was 100 ml in each case. In the transfer operations, a portion of the solvent volume was used for rinsing, and the solutions/suspensions were prepared under argon. For polymerizations in the presence of water, the water was degassed beforehand by passing argon through it for several hours; the same applies to the organic solvents used if they were not employed in dried form (see above).

3.1.1 Polymerization with Na$^+$[Ni(Ph)PPh$_3$(Ph$_2$PCH(SO$_3^-$)C(=O)(p-MeC$_6$H$_4$)]

The complex was dissolved (together if desired with the emulsifier, e.g., Triton® X-100 (1 g), sodium dodecyl sulfate (500 mg), hexadecyltrimethylammonium tetrafluoroborate (357 mg)) in 95 ml of water (in experiments with 50 ml of acetone, 30 ml of acetone was added to the aqueous complex solution) or 50 ml of organic solvent and the solution was stirred for 20 minutes (in order to ensure intimate contact between complex and water prior to the polymerization). Separately from this, ½ equivalent of acetylacetonatobis (ethylene)rhodium(I) was dissolved in 5 or 50 ml of the respective organic solvent (in the case of experiments with 50 ml of acetone, in 20 ml of acetone). Both solutions were subsequently transferred in succession (first activator, then complex) into the ethylene-flushed autoclave in countercurrent to the ethylene. The autoclave was then flushed a number of times with ethylene gas before the desired ethylene pressure was injected with stirring and the reactor was set to the appropriate temperature.

Following reaction, the autoclave was cooled with an ice bath and then let down.

3.1.2 Polymerization with [C$_{16}$H$_{33}$NMe$_3$]$^+$[Ni(Ph)PPh$_3$(Ph$_2$PCH(SO$_3^-$)C(=O)(p-MeC$_6$H$_4$)]

The solutions were prepared under argon. The catalyst was dissolved in half the volume of organic solvent, the appropriate amount of water was injected into this solution if desired, and then the mixture was stirred for 20 minutes (in order to ensure intimate contact between complex and water prior to the polymerization). Separately from this, ½ equivalent of acetylacetonatobis(ethylene)rhodium(I) was dissolved in the other half. Both solutions were subsequently transferred in succession (first activator, second complex) into the ethylene-flushed autoclave in countercurrent to the ethylene and then any remaining volume of water was injected. The autoclave was then flushed a number of times with ethylene gas before the desired ethylene pressure was injected with stirring and the reactor was set to the appropriate temperature.

The polymerizations were in each case conducted under a pressure of 50 bar; the reaction time was 2 hours.

Following reaction, the autoclave was cooled with an ice bath and then let down.

The results can be found in Table 1.

3.2 Workup 3.2.1 Workup of Batches without Added Emulsifier

Solid constituents were filtered off with suction and washed with methanol or acetone before being dried in a vacuum drying oven at 50° C. In some experiments, the filtrate was concentrated in order to analyze it for dissolved products.

3.2.2 Workup of Batches with Added Emulsifier

The emulsion obtained was first, where necessary, filtered with suction through a filter paper or glass wool, then filtered through glass wool. The particle diameters were determined using a Malvern Zetasizer. The emulsion was then poured into 200 ml of acetone and after half an hour of stirring the precipitated solid was filtered off with suction. The resultant solid was washed with methanol or acetone before being dried in a vacuum drying oven at 50° C.

4. Copolymerization Examples: Copolymerization of Ethylene with Norbornene 4.1. Polymerization in Water/Toluene Systems 4.1.1. Use of the Complex [C$_{16}$H$_{33}$N(CH$_3$)$_3$]$^+$[Ni(Ph)(PPh$_3$)($\kappa^2$P,OPh$_2$PC(SO$_3^-$)=C(—O)(p-MeC$_6$H$_4$)] (I a.2)

Solutions of 10.9 mg (4.2 µmol) of acetylacetonatobis (ethylene)-rhodium(I) and also of 91.0 mg (84.3 µmol) of [C$_{16}$H$_{33}$N(CH$_3$)$_3$]$^+$[Ni(Ph)(PPh$_3$)($\kappa$2P,OPh$_2$PC(SO$_3^-$)=C (—O)(p-MeC$_6$H$_4$)] were prepared separately from one another, each in 5 ml of toluene. Then 85 ml of water and the two solutions were transferred in succession in an ethylene countercurrent into an ethylene-flushed 250 ml steel autoclave with mechanical stirrer mechanism. A solution of 4.0 g (4.2 mmol) of norbornene in 5 ml of toluene was added. The autoclave was flushed with ethylene a number of times and then an ethylene pressure of 40 bar was injected with stirring (propeller stirrer, 1000 rpm).

After the reaction mixture had been stirred at room temperature for three hours, the excess pressure was let off and the solid formed was isolated by decanting and dried under reduced pressure at 50° C. (1 g). The polymer obtained is a sticky amorphous material. No precipitation of further polymeric products was observed when the liquid phases were combined with methanol.

4.1.2. Use of the Complex [Ni(Ph)(PPh$_3$) ($\kappa^2$N,O-(2-O-(3,5-I$_2$)—C$_6$H$_2$)—C(H)=N-2,6-(i-Pr)$_2$—C$_6$H$_3$] (I b.1)

Example 8: A solution of 5.0 g (53.1 mmol) of norbornene in 5 ml of toluene and a solution of 500 mg (0.8 mmol) of Triton X-100 in 90 ml of water were combined in ethylene countercurrent in an ethylene-flushed 250 ml steel autoclave with mechanical stirrer mechanism. Separately, a solution of 5.8 mg (22.6 µmol) of acetylacetonatobis(ethylene)rhodium(I) together with 42.0 mg (45.1 µmol) of [Ni(Ph)(PPh$_3$)($\kappa^2$N,O(2-O-(3,5-I$_2$)—C$_6$H$_2$)—C(H)=N-2,6-(i-Pr)$_2$—C$_6$H$_3$] in 5 ml of toluene was prepared and immediately likewise transferred into the autoclave. The autoclave was flushed with ethylene a number of times and then an ethylene pressure of 40 bar was injected with stirring (propeller stirrer, 1000 rpm).

After the reaction mixture had been stirred at room temperature for three hours, the excess pressure was let off. In addition to deposited solid (1.1 g; elastic and transparent) a dispersion was obtained. This dispersion was filtered through glass wool and the particle size was determined by means of static light scattering as being 170 nm. 1.1 g of copolymer were obtained from the dispersion by precipitation with methanol. The norbornene content of this copolymer was determined as being 14 mol % by means of $^{13}$C-NMR (1,1,2,2-tetrachloroethane-d$_2$, 122° C.).

Example 9: A solution of 700 mg (7.4 mmol) of norbornene in 1 ml of toluene and a solution of 1 g (1.6 mmol) of Triton X-100 in 95 ml of water were combined in ethylene countercurrent in an ethylene-flushed 250 ml steel autoclave with mechanical stirrer mechanism. Separately, a solution of 8.7 mg (33.9 µmol) of acetylacetonatobis(ethylene)rhodium(I) together with 63.0 mg (67.7 µmol) of [Ni(Ph)(PPh$_3$)($\kappa^2$N,O(2-O-(3,5-I$_2$)—C$_6$H$_2$)—C(H)=N-2,6-(i-Pr)$_2$—C$_6$H$_3$] in 4 ml of toluene was prepared and immediately likewise transferred into the autoclave. The autoclave was flushed with ethylene a number of times and then an ethylene pressure of 50 bar was injected with stirring (propeller stirrer, 1000 rpm).

After the reaction mixture had been stirred at room temperature for two hours, the excess pressure was let off. Following filtration through glass wool, a solid was deposited from the resultant polymer dispersion. The batch was introduced into 200 ml of methanol and the copolymer was isolated by filtration and dried under reduced pressure at 50° C. (1.3 g). The norbornene content of this copolymer was determined as being 10 mol % by means of $^{13}$C-NMR (1,1,2,2-tetrachloroethane-d$_2$, 122° C.).

4.2. Comparative Experiments: Polymerization in Pure Toluene

Use of the Complex [C$_{16}$H$_{33}$N(CH$_3$)$_3$]$^+$[Ni(Ph)(PPh$_3$) ($\kappa^2$P, OPh$_2$PC(SO$_3^-$)=C(—O) (p-MeC$_6$H$_4$)] (I. a.2)

Comparative example C10: Solutions of 7.2 mg (27.9 µmol) of acetylacetonatobis(ethylene)rhodium(I) and also of 60.0 mg (55.6 µmol) of [C$_{16}$H$_{33}$N(CH$_3$)$_3$]$^+$ [Ni(Ph)(PPh$_3$)—($\kappa$2P,OPh$_2$PC(SO$_3^-$)=C(—O)(p-MeC$_6$H$_4$)] were prepared separately from one another, each in 45 ml of toluene. Then both solutions were transferred in succession in ethylene countercurrent into an ethylene-flushed 250 ml steel autoclave with mechanical stirrer mechanism. 7.7 g (81.8 mmol) of norbornene, as a solution in 10 ml of toluene, were added. The autoclave was flushed with ethylene a number of times and then an ethylene pressure of 10 bar was injected with stirring (propeller stirrer, 1000 rpm).

After the reaction mixture had been stirred at room temperature for three hours, the excess pressure was let off. The clear solution obtained was introduced into 200 ml of methanol and the precipitated copolymer was isolated by decanting and dried under reduced pressure at 50° C. (1.5 g). The polymer obtained is transparent. WAXS investigations indicate a degree of crystallinity <2%.

Use of the Complex [Ni(Ph)(PPh$_3$)($\kappa^2$N,O-(2-O-(3,5-I$_2$)—C$_6$H$_2$)—C(H)=N-2,6-(i-Pr)$_2$—C$_6$H$_3$] (I b.1)

Comparative example C11: Solutions of 11.2 mg (43.4 µmol) of acetylacetonatobis(ethylene)rhodium(I) and also of 81.0 mg (87.1 µmol) of [Ni(Ph)(PPh$_3$)($\kappa^2$N,O(2-O-(3,5-I$_2$)—C$_6$H$_2$)—C(H)=N-2,6-(i-Pr)$_2$—C$_6$H$_3$] were prepared separately from one another, each in 45 ml of toluene. Then both solutions were transferred in succession in ethylene countercurrent into an ethylene-flushed 250 ml steel autoclave with mechanical stirrer mechanism. 10.0 g (106.2 mmol) of norbornene, as a solution in 10 ml of toluene, were added. The autoclave was flushed with ethylene a number of times and then an ethylene pressure of 10 bar was injected with stirring (propeller stirrer, 1000 rpm).

After the reaction mixture had been stirred at room temperature for three hours, the excess pressure was let off. The clear solution obtained was introduced into 200 ml of methanol and the precipitated copolymer was isolated by filtration and dried under reduced pressure at 50° C. (6 g). The polymer obtained is transparent and elastic. WAXS investigations indicate a degree of crystallinity <2%.

5. Use of a Mixture of Na$^+$[Ni(Ph)PPh$_3$(Ph$_2$PCH(SO$_3^-$)C(=O)(p-MeC$_6$H$_4$)] (I.a.1) and [Ni(Ph)(PPh$_3$)($\kappa^2$N,O(2-O-(3,5-I$_2$)—C$_6$H$_2$)—C(H)=N-2,6-(i-Pr)$_2$—C$_6$H$_3$] (I.b.1) for ethylene polymerization in Water (Example 12)

1 g of sodium dodecyl sulfate was dissolved under argon in 95 ml of deionized water (degassed by having argon passed through it for several hours) and the solution was transferred in ethylene countercurrent into a multiply ethylene-flushed 250 ml steel autoclave with mechanical stirrer mechanism. Then, under argon, a solution of 44.0 mg (54 µmol) of Na$^+$[Ni(Ph)PPh$_3$(Ph$_2$PCH(SO$_3^-$)C(=O)(p-MeC$_6$H$_4$)], 60.0 mg (64 µmol) of [Ni(Ph)(PPh$_3$)($\kappa^2$N,O(2-O-(3,5-I$_2$)—C$_6$H$_2$)—C(H)=N-2,6-(i-Pr)$_2$—C$_6$H$_3$] and 15.3 mg (59 µmol) of acetylacetonatobis(ethylene)rhodium(I) in 5 ml of acetone (degassed by having argon passed through it for several hours) was prepared and was immediately likewise transferred into the autoclave. The autoclave was flushed with ethylene gas a number of times, an ethylene pressure of 45 bar was injected with stirring (1000 rpm), and the reactor was conditioned to a temperature of 50° C.

After 2 hours, the autoclave was cooled to room temperature and the polymerization was then terminated by letting down the autoclave. The polyethylene formed was isolated by filtration, washed a number of times with water and also with methanol, and dried in a vacuum drying oven at 50° C. (3.2 g).

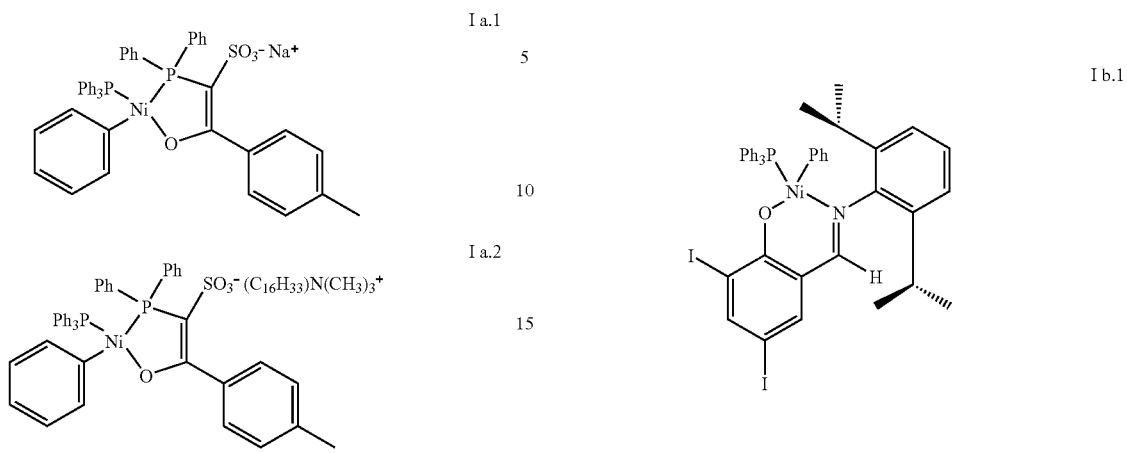

TABLE 1

| Example | Complex | μmol complex | Activator | Solvent volume ratio | Emulsifier | Temperature °C. | Yield polymer [g] | kg PE/ mol Ni-h | TOF/h | $M_w$ [g] | Q | η value [ml/g] |
|---|---|---|---|---|---|---|---|---|---|---|---|---|
| 1 | I a.1 | 89 | Rh(acac)et₂ | Toluene/H₂O 5:95 | — | 70 | 5.9 | 33.1 | 1178 | 3025 | 3.1 | 0.12 |
| 2 | I a.1 | 61 | Rh(acac)et₂ | Acetone/H₂O 50:50 | — | 70 | 1.8 | 14.8 | 517 | n.d. | n.d. | 0.30 |
| 3 | I a.1 | 108 | Rh(acac)et₂ | Acetone/H₂O 5:95 | — | 70 | 2.2 | 10.1 | 357 | 2233 | 2.3 | 0.14 |
| 4 | I a.1 | 120 | — | Acetone/H₂O 5:95 | 1 g Triton X-100 | 70 | 1.8 | 7.5 | 267 | 936 | 1.8 | 0.08 |
| 5 | I a.2 | 81 | Rh(acac)et₂ | Toluene/H₂O 5:95 | — | 50 | 1.2 | 0.9 | 32 | n.d. | n.d. | 0.54 |
| 6 | I b.1 | 19 | Rh(acac)et₂ | n-Pentane/H₂O 10:90 | — | 70 | 1.9 | 50.00 | 3488 | n.d. | n.d. | n.d. |

Key:
Me: methyl, Ph = phenyl, Rh(acac)et₂ = Rh(acac)(CH₂=CH₂)₂, acac: 2,4-pentanedionato; PE: polyethylene; n.d.: not determined; TOF: turnover frequency, ratios of the solvents are stated in % by volume.

TABLE 2

Copolymerization results

| Example | Complex | μmol complex | Activator | Solvent volume ratio | Emulsifier | Temperature °C. | Yield polymer [g] | kg polymer/ mol Ni-h | $M_n$ [g] | $M_w$ [g] | Q | Norbornene mol % | $T_g$ [°C.] |
|---|---|---|---|---|---|---|---|---|---|---|---|---|---|
| 7 | I a.2 | 84.3 | Rh(acac)et₂ | Toluene/H₂O 85:10 | — | 25 | 1.0 | 4.0 | 1802 | 11170 | 6.2 | n.d. | n.d. |
| 8 | I b.1 | 45.1 | Rh(acac)et₂ | Toluene/H₂O 85:15 | 0.5 g Triton X-100 | 25 | 2.2 | 16.3 | 88100 | 186900 | 2.1 | 19 | −4 |
| 9 | I b.1 | 67.7 | Rh(acac)et₂ | Toluene/H₂O 95:5 | 1 g Triton X-100 | 25 | 1.3 | 9.6 | 337650 | 1111300 | 3.3 | 10 | n.d. |
| C10 | I a.2 | 55.6 | Rh(acac)et₂ | Toluene | — | 25 | 1.5 | 9.0 | 1990 | 15700 | 7.9 | 25 | 25 |
| C11 | I b.1 | 87.1 | Rh(acac)et₂ | Toluene | — | 25 | 6.0 | 23.0 | 77310 | 13900 | 1.8 | 19 | 6 |
| 12 | Ia.1 + Ib.1 | 118 | Rh(acac)et₂ | Acetone/H₂O 95:5 | — | 50 | 3.2 | 13.6 | n.d. | n.d. | n.d. | n.d. | n.d. |

C10 and C11 are comparative examples without addition of water.
Analysis: degree of crystallinity by WAXS (wide angle X-ray scattering)
$M_w$, $M_n$: gel permeation chromatography, 1,2,4-trichlorobenzene, 140° C., calibrated with linear polyethylene standards.
Norbornene content: ¹³C-NMR spectroscopy, 1,1,2,2-tetrachloroethane-d₂, all amounts in mol %.

We claim:
1. A process for emulsion polymerizing one or more olefins, said process comprising:
reacting said olefins with a complex compound of formula Ia or Ib or with a mixture of said complex compounds Ia and Ib

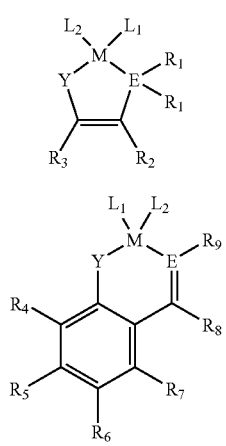

where:
M is a transition metal selected from the group consisting of Groups 7 to 10 of the Periodic Table of the Elements;
$L^1$ is a phosphine of formula $(R^{16})_x PH_{3-x}$ or an amine of formula $(R^{16})_x NH_{3-x}$ with identical or different radicals $R^{16}$, an ether $(R^{16})_2 O$, $H_2O$, an alcohol $(R^{16})OH$, pyridine, a pyridine derivative of formula $C_5H_{5-x}(R^{16})_n N$, CO, a $C_1$–$C_{12}$ alkylnitriles, a $C_6$–$C_{14}$ arylnitrile or an ethylenically unsaturated double bond system, wherein x is an integer ranging from 0 to 3 and wherein $R^{16}$ is hydrogen, $C_1$–$C_{20}$ alkyl groups, which optionally are substituted by $O(C_1$–$C_6$ alkyl) or groups; $C_3$–$C_{12}$ cycloalkyl groups, $C_7$–$C_{13}$ aralkyl radicals or $C_6$–$C_{14}$ aryl groups unsubstituted or substituted by a hydrophilic group X;
$L^2$ is a halide ion, an amide ion of formula $R_h NH_{2-h}$, wherein h is an integer ranging from 0 to 2, a $C_1$–$C_6$ alkyl anion, an allyl anion, a benzyl anion or an aryl anion, where, optionally, $L^1$ and $L^2$ are linked to one another by one or more covalent bonds;
E is nitrogen, phosphorus, arsenic or antimony;
n is an integer ranging from 0 to 15;
Y is oxygen, sulfur, N—$R^{10}$ or P—$R^{10}$;
$R^1$ is hydrogen, or a $C_1$–$C_{12}$ alkyl group, a $C_7$–$C_{13}$ aralkyl radical or a $C_6$–$C_{14}$ aryl group, each unsubstituted or substituted by a hydrophilic group X, wherein X is —$SO_3^-$, —O—$PO_3^{2-}$, $NH(R^{15})_2^+$, $N(R^{15})_3^+$ or —$(OCH_2CH_2)_n OH$;
$R^2$ and $R^3$ are hydrogen, hydrophilic group X, branched or unbranched $C_1$–$C_{12}$ alkyl, $C_1$–$C_{12}$ alkyl substituted one or more times by identical or different substituents selected from the group consisting of $C_1$–$C_{12}$ alkyl groups, halogens, hydrophilic group X, $C_1$–$C_{12}$ alkoxy groups and $C_1$–$C_{12}$ thioether groups; $C_7$–$C_{13}$ aralkyl, $C_3$–$C_{12}$ cycloalkyl, $C_3$–$C_{12}$ cycloalkyl substituted one or more times by identical or different substituents selected from the group consisting of $C_1$–$C_{12}$ alkyl groups, halogens, hydrophilic group X, $C_1$–$C_{12}$ alkoxy groups and $C_1$–$C_{12}$ thioether groups; $C_6$–$C_{14}$ aryl, $C_6$–$C_{14}$ aryl substituted one or more times by identical or different substituents selected from the group consisting of $C_1$–$C_{12}$ alkyl groups, halogens, hydrophilic group X, monohalogenated, polyhalogenated $C_1$–$C_{12}$ alkyl groups, $C_1$–$C_{12}$ alkoxy groups, silyloxy groups $OSiR^{10}R^{11}R^{12}$, amino groups $NR^{13}R^{14}$ and $C_1$–$C_{12}$ thioether groups, $C_1$–$C_{12}$ alkoxy groups, silyloxy groups $OSiR^{10}R^{11}R^{12}$, halogens or amino groups $NR^{13}R^{14}$, where $R^2$ and $R^3$ together optionally form a saturated or unsaturated 5- to 8-membered ring, and with the proviso that at least one radical $R^1$, $R^2$ or $R^3$ carries a hydrophilic group X or that $R^2$ or $R^3$ is a hydrophilic group X;
$R^4$ to $R^7$ are hydrogen, hydrophilic group X, branched or unbranched $C_1$–$C_{12}$ alkyl, $C_1$–$C_{12}$ alkyl, substituted one or more times by identical or different substituents selected from the group consisting of $C_1$–$C_{12}$ alkyl groups, halogens, hydrophilic groups X, $C_1$–$C_{12}$ alkoxy groups and $C_1$–$C_{12}$ thioether groups, $C_7$–$C_{13}$ aralkyl, $C_3$–$C_{12}$ cycloalkyl, $C_3$–$C_{12}$ cycloalkyl substituted one or more times by identical or different substituents selected from the group consisting of $C_1$–$C_{12}$ alkyl groups, halogens, hydrophilic group X, $C_1$–$C_{12}$ alkoxy groups and $C_1$–$C_{12}$ thioether groups; $C_6$–$C_{14}$ aryl, $C_6$–$C_{14}$ aryl substituted one or more times by identical or different substituents selected from the group consisting of $C_1$–$C_{12}$ alkyl groups, halogens, hydrophilic group X, monohalogenated $C_1$–$C_{12}$ alkyl groups, polyhalogenated $C_1$–$C_{12}$ alkyl groups, $C_1$–$C_{12}$ alkoxy groups, silyloxy groups $OSiR^{10}R^{11}R^{12}$, amino groups $NR^{13}R^{14}$ and $C_1$–$C_{12}$ thioether groups; $C_1$–$C_{12}$ alkoxy groups, silyloxy groups $OSiR^{10}R^{11}R^{12}$, halogens, $NO_2$ groups or amino groups $NR^{13}R^{14}$, where $R^4$ to $R^7$ together optionally form a saturated or unsaturated 5-8-membered ring, wherein at least one of the groups $R^4$ to $R^7$ is a hydrophilic group X;
$R^8$ and $R^9$ are hydrogen, $C_1$–$C_6$ alkyl groups, $C_7$–$C_{13}$ aralkyl radicals and $C_6$–$C_{14}$ aryl groups, each of which carries a hydrophilic group X,
$R^{10}$ to $R^{15}$ are, independently of one another, hydrogen, $C_1$–$C_{20}$ alkyl groups, which optionally are substituted by $O(C_1$–$C_6$ alkyl) or $N(C_1$–$C_6$ alkyl)$_2$ groups; or are $C_3$–$C_{12}$ cycloalkyl groups, $C_7$–$C_{13}$ aralkyl radicals or $C_6$–$C_{14}$ aryl groups; in water or in a solvent mixture containing at least 50% by volume of water, optionally in the presence of an activator and an emulsifier.

2. The process as claimed in claim 1, wherein the olefin is reacted with at least one electrically neutral nickel complex compound of formula Ia or Ib.

3. The process as claimed in claim 1, wherein the activator comprises one or more olefin complexes of rhodium or nickel.

4. The process as claimed in claim 1, wherein the reaction is conducted in the presence of an emulsifier.

5. The process as claimed in claim 1, wherein one of the olefins is ethylene.

6. The process as claimed in claim 1, wherein one olefin is ethylene and the comonomer is selected from the group consisting of propylene, 1-butene, 1-hexene and styrene.

7. The process as claimed in claim 1, wherein one olefin is ethylene and the comonomer is selected from the group consisting of norbornene, norbornadiene, cis-2-butene and trans-2-butene.

8. A dispersion of polyethylene or ethylene copolymers in water obtained by the process as claimed in claim 1.

9. A paper size or colored paper coating slip comprising a dispersion as claimed in claim 8.

10. A paint comprising a dispersion as claimed in claim 8.

11. An adhesive base material comprising a dispersion as claimed in claim 8.

12. A molded foam or mattress produced from a dispersion as claimed in claim 8.

13. A textile or leather application comprising a dispersion as claimed in claim 8.

14. A carpet back coating comprising a dispersion as claimed in claim 8.

15. A pharmaceutical preparation comprising a dispersion as claimed in claim 8.

16. A method, comprising:
applying a composition, said composition comprising the aqueous polyethylene dispersion as claimed in claim 8, to a substrate.

17. A process for emulsion polymerizing one or more olefins, said process comprising:
reacting said olefins with a complex compound of formula Ia or Ib or with a mixture of said complex compounds Ia and Ib

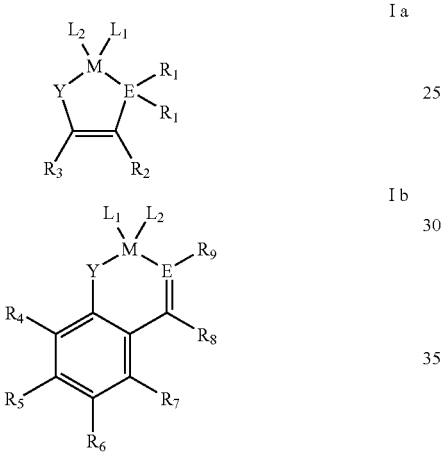

where:
M is a transition metal selected from the group consisting of Groups 7 to 10 of the Periodic Table of the Elements;
$L^1$ is a phosphine of formula $(R^{16})_xPH_{3-x}$, or an amine of formula $(R^{16})_xNH_{3-x}$ with identical or different radicals $R^{16}$, an ether $(R^{16})_2O$, $H_2O$, an alcohol $(R^{16})OH$, pyridine, a pyridine derivative of formula $C_5H_{5-x}(R^{16})_xN$, wherein $R^{16}$ is hydrogen, $C_1$–$C_{20}$ alkyl groups, which optionally are substituted by $O(C_1$–$C_6$ alkyl) or $N(C_1$–$C_6$ alkyl)$_2$ groups; $C_3$–$C_{12}$ cycloalkyl groups, $C_7$–$C_{13}$ aralkyl radicals or $C_6$–$C_{14}$ aryl groups unsubstituted or substituted by a hydrophilic group X, CO, a $C_1$–$C_{12}$ alkylnitrile, a $C_6$–$C_{14}$ arylnitrile or an ethylenically unsaturated double bond system, wherein x is an integer ranging from 0 to 3;
$L^2$ is a halide ion, an amide ion of formula $R_hNH_{2-h}$, wherein h is an integer ranging from 0 to 2, a $C_1$–$C_6$ alkyl anion, an allyl anion, a benzyl anion or an aryl anion, where, optionally, $L^1$ and $L^2$ are linked to one another by one or more covalent bonds;
E is nitrogen, phosphorus, arsenic or antimony;
n is an integer ranging from 0 to 15;
Y is oxygen, sulfur, N—$R^{10}$ or P—$R^{10}$;
$R^1$ is hydrogen, hydrophilic group X, or a $C_1$–$C_{12}$ alkyl group, a $C_7$–$C_{13}$ aralkyl radical or a $C_6$–$C_{14}$ aryl group, each unsubstituted or substituted by a hydrophilic group X, wherein X is $SO_3^-$, —O—$PO_3^{2-}$, $NH(R^{15})_2^+$, $N(R^{15})_3^+$ or —$(OCH_2CH_2)_nOH$;
$R^2$ and $R^3$ are hydrogen, hydrophilic group X, branched or unbranched $C_1$–$C_{12}$ alkyl, $C_1$–$C_{12}$ alkyl substituted one or more times by identical or different substituents selected from the group consisting of $C_1$–$C_{12}$ alkyl groups, halogens, hydrophilic group X, $C_1$–$C_{12}$ alkoxy groups and $C_1$–$C_{12}$ thioether groups; $C_7$–$C_{13}$ aralkyl, $C_3$–$C_{12}$ cycloalkyl, $C_3$–$C_{12}$ cycloalkyl substituted one or more times by identical or different substituents selected from the group consisting of $C_1$–$C_{12}$ alkyl groups, halogens, hydrophilic group X, $C_1$–$C_{12}$ alkoxy groups and $C_1$–$C_{12}$ thioether groups; $C_6$–$C_{14}$ aryl, $C_6$–$C_{14}$ aryl substituted one or more times by identical or different substituents selected from the group consisting of $C_1$–$C_{12}$ alkyl groups, halogens, hydrophilic group X, monohalogenated, polyhalogenated $C_1$–$C_{12}$ alkyl groups, $C_1$–$C_{12}$ alkoxy groups, silyloxy groups $OSiR^{10}R^{11}R^{12}$, amino groups $NR^{13}R^{14}$ and $C_1$–$C_{12}$ thioether groups, $C_1$–$C_{12}$ alkoxy groups, silyloxy groups $OSiR^{10}R^{11}R^{12}$, halogens or amino groups $NR^{13}R^{14}$, where $R^2$ and $R^3$ together optionally form a saturated or unsaturated 5- to 8-membered ring, and with the proviso that at least one radical $R^1$, $R^2$ or $R^3$ carries a hydrophilic group X or that $R^2$ or $R^3$ is a hydrophilic group X;
$R^4$ to $R^7$ are hydrogen, hydrophilic group X, branched or unbranched $C_1$–$C_{12}$ alkyl, $C_1$–$C_{12}$ alkyl, substituted one or more times by identical or different substituents selected from the group consisting of $C_1$–$C_{12}$ alkyl groups, halogens, hydrophilic groups X, $C_1$–$C_{12}$ alkoxy groups and $C_1$–$C_{12}$ thioether groups, $C_7$–$C_{13}$ aralkyl, $C_3$–$C_{12}$ cycloalkyl, $C_3$–$C_{12}$ cycloalkyl substituted one or more times by identical or different substituents selected from the group consisting of $C_1$–$C_{12}$ alkyl groups, halogens, hydrophilic group X, $C_1$–$C_{12}$ alkoxy groups and $C_1$–$C_{12}$ thioether groups; $C_6$–$C_{14}$ aryl, $C_6$–$C_{14}$ aryl substituted one or more times by identical or different substituents selected from the group consisting of $C_1$–$C_{12}$ alkyl groups, halogens, hydrophilic group X, monohalogenated $C_1$–$C_{12}$ alkyl groups, polyhalogenated $C_1$–$C_{12}$ alkyl groups, $C_1$–$C_{12}$ alkoxy groups, silyloxy groups $OSiR^{10}R^{11}R^{12}$, amino groups $NR^{13}R^{14}$ and $C_1$–$C_{12}$ thioether groups; $C_1$–$C_{12}$ alkoxy groups, silyloxy groups $OSiR^{10}R^{11}R^{12}$, halogens, $NO_2$ groups or amino groups $NR^{13}R^{14}$, where $R^4$ to $R^7$ together optionally form a saturated or unsaturated 5-8-membered ring, wherein at least one of the groups $R^4$ to $R^7$ is a hydrophilic group X;
$R^8$ and $R^9$ are hydrogen, $C_1$–$C_6$ alkyl groups, $C_7$–$C_{13}$ aralkyl radicals and $C_6$–$C_{14}$ aryl groups, each of which carries a hydrophilic group X,
$R^{10}$ to $R^{15}$ are, independently of one another, hydrogen, $C_1$–$C_{20}$ alkyl groups, which optionally are substituted by $O(C_1$–$C_6$ alkyl) or $N(C_1$–$C_6$ alkyl)$_2$ groups; or are $C_3$–$C_{12}$ cycloalkyl groups, $C_7$–$C_{13}$ aralkyl radicals or $C_6$–$C_{14}$ aryl groups;
in water or in a solvent mixture containing at least 50% by volume of water, optionally in the presence of an activator and an emulsifier.

* * * * *